United States Patent
Kwan et al.

(10) Patent No.: US 10,581,759 B1
(45) Date of Patent: Mar. 3, 2020

(54) SHARING PACKET PROCESSING RESOURCES

(71) Applicant: Innovium, Inc., San Jose, CA (US)

(72) Inventors: Bruce Hui Kwan, Sunnyvale, CA (US); William Brad Matthews, San Jose, CA (US); Puneet Agarwal, Cupertino, CA (US)

(73) Assignee: Innovium, Inc., San Jose, CA (US)

( * ) Notice: Subject to any disclaimer, the term of this patent is extended or adjusted under 35 U.S.C. 154(b) by 0 days.

(21) Appl. No.: 16/033,680

(22) Filed: Jul. 12, 2018

(51) Int. Cl.
| | |
|---|---|
| *H04L 12/937* | (2013.01) |
| *H04L 12/707* | (2013.01) |
| *H04L 12/741* | (2013.01) |
| *H04L 12/863* | (2013.01) |
| *H04L 12/24* | (2006.01) |
| *H04L 12/861* | (2013.01) |
| *H04L 29/06* | (2006.01) |
| *H04L 12/835* | (2013.01) |

(52) U.S. Cl.
CPC ........ *H04L 49/254* (2013.01); *H04L 41/0893* (2013.01); *H04L 41/0896* (2013.01); *H04L 45/24* (2013.01); *H04L 45/74* (2013.01); *H04L 47/30* (2013.01); *H04L 47/6255* (2013.01); *H04L 49/90* (2013.01); *H04L 69/22* (2013.01)

(58) Field of Classification Search
CPC . G06F 2201/845; H04L 1/0084; H04L 47/10; H04W 28/08
See application file for complete search history.

(56) References Cited

U.S. PATENT DOCUMENTS

| | | | | |
|---|---|---|---|---|
| 5,402,478 | A | * 3/1995 | Hluchyj | ............... H04Q 3/66 379/115.01 |
| 7,706,316 | B1 | * 4/2010 | Kuik | ................ H04L 12/4633 370/320 |
| 2003/0074473 | A1 | * 4/2003 | Pham | .................. H04L 29/06 709/246 |
| 2008/0259799 | A1 | 10/2008 | Beek | |

(Continued)

OTHER PUBLICATIONS

United States Patent and Trademark Office, U.S. Appl. No. 15/433,825, Non-Final Office Action dated Dec. 20, 2018.

(Continued)

*Primary Examiner* — Ayaz R Sheikh
*Assistant Examiner* — Debebe A Asefa
(74) *Attorney, Agent, or Firm* — Wong & Rees LLP; Karl T. Rees

(57) ABSTRACT

The efficiency of the network device is improved by sharing a packet processor across two or more control paths. Data unit sources send the first portion of each data unit that passes through the sources to the shared packet processor via their respective control paths. The packet processor generates control information for each of the data units, and sends the control information to a merger component that corresponds to the source of the data unit. The merger component merges the control information with a payload portion of the data unit that the data unit source sent along a separate data path. To better facilitate the sharing of the packet processor, the control paths may converge at an adaptive distributor, which uses a policy-based mechanism to select which data unit portion to forward to the packet processor in a given time slot. The policy may change based on various demand measures.

20 Claims, 8 Drawing Sheets

(56) References Cited

U.S. PATENT DOCUMENTS

| | | |
|---|---|---|
| 2009/0240850 A1 | 9/2009 | Li et al. |
| 2010/0118884 A1 | 5/2010 | Hendel et al. |
| 2012/0327779 A1 | 12/2012 | Gell et al. |
| 2013/0044755 A1 | 2/2013 | Liu et al. |
| 2013/0084063 A1 | 4/2013 | Hu et al. |
| 2013/0151646 A1 | 6/2013 | Chidambaram et al. |
| 2013/0235880 A1 | 9/2013 | Goldman et al. |
| 2014/0146682 A1 | 5/2014 | Kakadia et al. |
| 2014/0185368 A1 | 7/2014 | Zecharia et al. |
| 2014/0281809 A1 | 9/2014 | Billa et al. |
| 2015/0121395 A1 | 4/2015 | Ansari et al. |
| 2015/0156129 A1 | 6/2015 | Tsuruoka |
| 2015/0229567 A1 | 8/2015 | Hussain et al. |
| 2015/0263955 A1 | 9/2015 | Talaski et al. |
| 2016/0156562 A1 | 6/2016 | Vedula et al. |
| 2017/0310756 A1 | 10/2017 | Pandya |

OTHER PUBLICATIONS

United States Patent and Trademark Office, U.S. Appl. No. 15/433,825, Non-Final Office Action dated Jul. 5, 2019.
United States Patent and Trademark Office, U.S. Appl. No. 15/433,825, Notice of Allowance dated Oct. 9, 2019.

* cited by examiner

FIG. 5     500

SHARING PACKET PROCESSING RESOURCES

TECHNICAL FIELD

Embodiments relate generally to handling network packets and/or other data units in systems such as, without limitation, data switching networks, and, more specifically, to techniques for improving resource utilization while processing said data units.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A computer network is a set of computing components interconnected by communication links. Each computing component may be a separate computing device, such as, without limitation, a hub, switch, bridge, router, server, gateway, or personal computer, or a component thereof. Each computing component, or "network device," is considered to be a node within the network. A communication link is a mechanism of connecting at least two nodes such that each node may transmit data to and receive data from the other node. Such data may be transmitted in the form of signals over transmission media such as, without limitation, electrical cables, optical cables, or wireless media.

The structure and transmission of data between nodes is governed by a number of different protocols. There may be multiple layers of protocols, typically beginning with a lowest layer, such as a "physical" layer that governs the transmission and reception of raw bit streams as signals over a transmission medium. Each layer defines a data unit (the protocol data unit, or "PDU"), with multiple data units at one layer combining to form a single data unit in another. Additional examples of layers may include, for instance, a data link layer in which bits defined by a physical layer are combined to form a frame or cell, a network layer in which frames or cells defined by the data link layer are combined to form a packet, and a transport layer in which packets defined by the network layer are combined to form a TCP segment or UDP datagram. The Open Systems Interconnection model of communications describes these and other layers of communications. However, other models defining other ways of layering information may also be used. The Internet protocol suite, or "TCP/IP stack," is one example of a common group of protocols that may be used together over multiple layers to communicate information. However, techniques described herein may have application to other protocols outside of the TCP/IP stack.

A given node in a network may not necessarily have a link to each other node in the network, particularly in more complex networks. For example, in wired networks, each node may only have a limited number of physical ports into which cables may be plugged in to create links. Certain "terminal" nodes—often servers or end-user devices—may only have one or a handful of ports. Other nodes, such as switches, hubs, or routers, may have a great deal more ports, and typically are used to relay information between the terminal nodes. The arrangement of nodes and links in a network is said to be the topology of the network, and is typically visualized as a network graph or tree.

A given node in the network may communicate with another node in the network by sending data units along one or more different paths through the network that lead to the other node, each path including any number of intermediate nodes. The transmission of data across a computing network typically involves sending units of data, such as packets, cells, or frames, along paths through intermediary networking devices, such as switches or routers, that direct or redirect each data unit towards a corresponding destination.

While a data unit is passing through an intermediary networking device—a period of time that is conceptualized as a "visit" or "hop"—the device may perform any of a variety of actions, or processing steps, with the data unit. The exact set of actions taken will depend on a variety of characteristics of the data unit, such as metadata found in the header of the data unit, and in many cases the context or state of the network device. For example, address information specified by or otherwise associated with the data unit, such as a source address, destination address, or path information, is typically used to determine how to handle a data unit (i.e. what actions to take with respect to the data unit). For instance, an Internet Protocol ("IP") data packet may include a destination IP address field within the header of the IP data packet, based upon which a network device may determine one or more other networking devices, among a number of possible other networking devices, to forward the IP data packet to.

A network device may include any number of internal hardware and/or software components configured to handle the movement of data between processing components within the device and, eventually, out of the device. It is desirable for these components to quickly determine where to send and/or store data for processing, and to expediently send and/or store that data to the appropriate destination once determined.

In network devices, the handling of data units such as packets is often divided into two parallel paths—a control path and a data path. Portions of the data unit critical to the determination of how to handle the packet—typically the "start-of-packet" (or "SOP")—is forwarded along the control path for processing by a packet processor. The result of this processing is known as the data unit's "control information," and is typically used to instruct the network device in forwarding the data unit to another subcomponent of the network device and/or out an external communication interface. Other portions of the data unit—typically referred to as the "payload"—are forwarded along the data path. The control path and the data path eventually converge at a merger unit, which merges the data unit together again along with the control information. Since a data unit may be processed multiple times as it is handled by a network device, a data unit may pass through multiple pairings of control paths and data paths, each corresponding to different stages of processing.

Complex, high-bandwidth network devices such as, without limitation, network switches used in data centers, may include large numbers of subcomponents that handle data units from different sources in parallel. The circuitry of the device may therefore require multiple pairs of control paths and data paths, each coupled to a different source of data units. For instance, for an ingress processing stage, a device may include multiple ingress arbiters, each coupled to a different set of physical and/or logical ports. Each ingress arbiter may be coupled to its own control path, data path, and merger unit. Similarly, for an egress processing stage, a device may include multiple traffic managers configured to receive data units. Each traffic manager may be coupled to its own control path, data path, and merger unit.

BRIEF DESCRIPTION OF THE DRAWINGS

The present inventive subject matter is illustrated by way of example, and not by way of limitation, in the figures of the accompanying drawings and in which like reference numerals refer to similar elements and in which.

DETAILED DESCRIPTION

Figure 1:
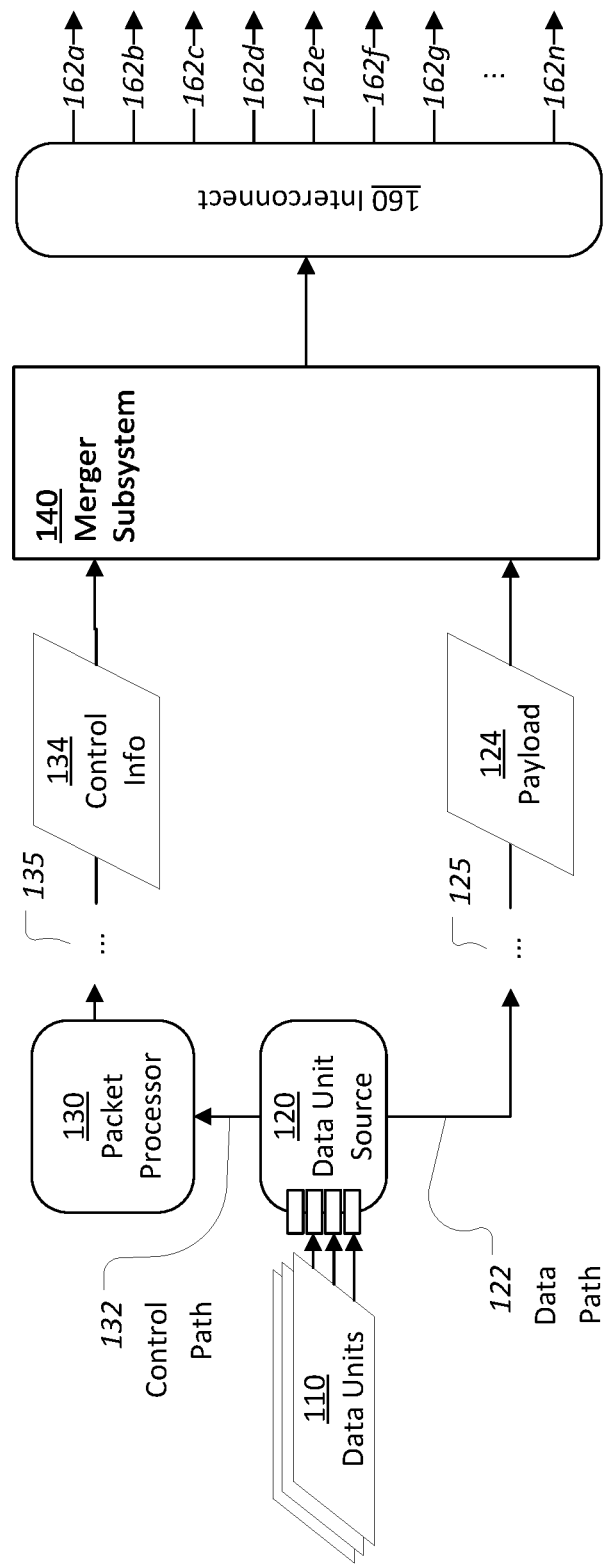
FIG. 1 is an illustrative view of various aspects of an example data handling system in which data units are processed using a control path and a data path.

In the following description, for the purposes of explanation, numerous specific details are set forth in order to provide a thorough understanding of the present inventive subject matter. It will be apparent, however, that the present inventive subject matter may be practiced without these specific details. In other instances, well-known structures and devices are shown in block diagram form in order to avoid unnecessarily obscuring the present inventive subject matter.

Embodiments are described herein according to the following outline:

1.0. General Overview
2.0. Structural Overview
2.1. Data Unit Source
2.2. Control and Data Paths
2.3. Merger Component
2.4. Interconnect Component
2.5. Example Data Handling System with Cell-Based Traffic
2.6. Shared Packet Processor
2.7. Adaptive Distributor
2.8. Shared Data Path Resources
2.9. Miscellaneous
3.0. Functional Overview
3.1. Forwarding a Data Unit Along Control and Data Paths
3.2. Sharing a Packet Processor
4.0. Example Embodiments
5.0. Example Implementing System
5.1. Network Packets
5.2. Network Paths
5.3. Network Device
5.4. Ports
5.5. Packet Processors
5.6. Buffers
5.7. Queues
5.8. Egress Traffic Management
5.9. Arbiter
5.10. Miscellaneous
6.0. Implementation Mechanism—Hardware Overview
7.0. Extensions and Alternatives

1.0. GENERAL OVERVIEW

Approaches, techniques, and mechanisms are disclosed for sharing packet processing resources in a network device. Conventionally, each control path is connected to its own packet processor. This configuration places practical limitations on the number of data unit sources that are used in any particular processing stage within the network device. For instance, since each data unit source has a separate control path, and each additional control path conventionally includes an additional packet processor, each additional data unit source typically increases the number of processor required, which in turn increases design and/or manufacturing costs. Moreover, the packet processors may be some of the more power-demanding components of a network device. Since the packet processors are configured for execution in parallel, the network device must be designed around the assumption that each packet processor may be executing concurrently. Each additional packet processor in a network device may thereby increase the peak power requirements of the network device.

According to an embodiment, among other aspects, the efficiency of the network device is improved by sharing a packet processor across two or more control paths corresponding to different data unit sources. Via their respective control paths, the data unit sources send the control portion (e.g. the SOP cell) of each data unit that passes through the sources to a shared packet processor. For each data unit, the packet processor generates control information based on the control portion of that data unit, and sends the control information to a merger component that corresponds to the source of the data unit. The merger component merges the control information with the portion of the data unit that was sent along the data path. The merged data unit is then forwarded to an interconnect or other system component configured to use the control information to send the data unit to one of any number of connected outputs.

In an embodiment, to better facilitate the sharing of the packet processor an adaptive distributor component is deployed between the data unit sources and the packet processor. The adaptive distributor relays the control portions of the data units from the control paths to the packet processor.

According to an embodiment, the packet processor is capable of processing only a limited number of data units in a given period of time (e.g. clock cycle). The adaptive distributor may, on occasions, receive the control portions of the data units at a rate that is greater than the rate at which the packet processor is capable of processing the data units. The packet processor is therefore configured to temporarily buffer the control portions for at least some of the data units in one or more memory buffers. In an embodiment, the adaptive distributor utilizes an adaptive distribution policy to determine an order in which to release the control portions of the data units from the memory buffers to the packet processor. This order may not necessarily correspond to the order in which the control portions were received, and may instead prioritize data units based on factors such as a priority level assigned to the data unit source or data unit, a current demand level for the data unit source, and so forth.

The mechanisms and techniques are particularly useful in high-bandwidth devices, in which a packet processor may conventionally sit idle a significant amount of the time after it has processed the control portion of a data unit, waiting for the data unit source to begin sending the next data unit (or, more specifically, the control portion thereof). This is because a packet processor will frequently complete the processing of the control portion of a data unit well before the data unit source finishes sending the payload portion of the data unit, which is frequently significantly larger than the control portion, down the data path. Among other aspects, then, in these and other embodiments, sharing a packet processor between multiple control paths may therefore provide reduced peak power requirements and/or manufacturing costs, while also or instead enabling more complex device designs with larger numbers of data unit sources.

In other aspects, the inventive subject matter encompasses computer apparatuses and computer-readable media configured to carry out the foregoing techniques.

2.0. STRUCTURAL OVERVIEW

FIG. 1 is an illustrative view of various aspects of an example data handling system 100 in which data units are processed using a control path and a data path. Data handling system 100 is a component of an apparatus such as a network device comprising any combination of hardware and software configured to implement the various logical components described herein. For example, the apparatus may be a single networking computing device, such as a router or switch, in which some or all of the components 120-160 described herein are implemented using application-specific integrated circuits (ASICs) or field programmable gate arrays (FPGAs). As another example, an implementing apparatus may include one or more memories storing instructions for implementing various components described herein, one or more hardware processors configured to execute the instructions stored in the one or more memories, and various data repositories in the one or more memories for storing data structures utilized and manipulated by the various components 120-160.

The forwarding logic of a network device may include any number of processing stages, each comprising one or more data handling systems 100 configured to move data units inside the network device. In an embodiment, for example, there may be ingress and egress processing stages, each including one or more data handling systems 100.

2.1. Data Unit Source

Data handling system 100 is configured to handle data units 110. A data unit 110 may be, for instance, a packet, cell, frame, or any other suitable data unit. The data units 110 are received at a data unit source 120. Examples of a data unit source 120 include, without limitation, an ingress arbiter or an egress traffic manager, such as described in other sections. However, a data unit source 120 may take any other suitable form, so long as it is configured to send data units 110 out a control path 132 and a data path 122, as described in the next section.

A data unit source 120 may receive data units 110 from another source that is external to the apparatus in which the data handling system 100 is implemented, or from another internal component of the apparatus. For example, when the data unit source 120 is an ingress arbiter, data unit source 120 may receive data units 110 in parallel through any of a plurality of different ports of the network device. As another example, when the data unit source 120 is an egress traffic manager, the data unit source 120 may receive data units 110 in parallel from one or more ingress packet processors or interconnects to which the data unit source 120 is directly connected.

In an embodiment, a data unit source 120 is configured to buffer data units in one or more memory banks coupled to the data unit source 120. The data unit source 120 may include various logic for determining when to buffer and when to send data units 110, or portions thereof. In an embodiment, a data unit source 120 may utilize one or more queues for determining when to release data units 110. In an embodiment, a data unit source 120 may perform various low-level operations such as assembling data units and/or subunits from bits and/or other subunits. A data unit source 110 need not forward all data units 110 that it receives out the control path 132 and data path 122. Rather, the data unit source 120 may include logic configured to drop various data units 110, such as when the data units 110 fail various checks and/or when resources related to the data unit source 120 are in danger of becoming congested.

2.2. Control and Data Paths

Assuming that a data unit 110 is not dropped by a data unit source 110, the data unit source 120 sends the data unit 110, or at least portions of the data unit 110, along two different paths. Each path may be a physical path over which signals representing the data unit 110 are carried (e.g. specific wiring, traces, and/or other circuitry), or a logical path. The data unit source 120 sends at least a first portion of the data unit 110 down a first path 132 (referred to herein as the "control" path 132), and at least the remainder of the data unit 110 down a second path 122 (referred to herein as the "data" path 122).

The first portion of the data unit 110 that is sent down the control path 132, also referred to herein as the "control" portion, may be, for instance, a header, a fixed-size portion of the data unit 110 that contains the header, a start-of-packet ("SOP") subunit of the data unit 110 (e.g. the first cell or frame of a packet), or any other portion that includes enough information to generate control information 134 for the data unit 110. In some embodiments, or if the data unit 110 is sufficiently small (e.g. a single cell), the entire data unit 110 may be sent down the control data path 132.

The control path 132 includes a processing unit, referred to as a packet processor 130, that inspects the control portion of the data unit 110 and generates control information 134 based thereon. The control information 134 may simply include information already in the data unit 110 (e.g. addressing information, priority data, or labels in the header of the data unit 110), may replace such information in the data unit 110 (e.g. a new destination address or a revised priority level), or may be additive with respect to the information in the header (e.g. internal markings, path information, tracking information, a next internal destination component to process the data unit, other handling instructions, etc.). The control information 134 may be generated based on rule-based and/or hard-coded logic within the packet processor 130. In an embodiment, the control information 134 may optionally be processed by one or more additional components 135.

The portion of the data unit 110 sent down the data path 122 is referred to herein as payload 124. Payload 124 may be the entire data unit 110, or at least the remainder of the data unit 110, depending on the embodiment. The data path 122, in its simplest form, simply moves the payload 124 from the data unit source 120 to the merging component 140. Optionally, the data path 122 may include any number of intermediate relays or processing components 125 through which the payload 124 is routed, and which may or may not transform the payload 124. In most embodiments, any processing along the data path 122 is performed relatively quickly, such that at least some of the payload 124 arrives at the merging component 140 prior to the packet processor 130 generating the control information 134 associated with the data unit 110.

In some embodiments, any number of data units 110 may be received concurrently. The data unit source 120 need not wait for a full data unit 110 to be received, but rather may begin sending subunits down the control path 132 and/or data path 122 as soon as the subunits are assembled. For instance, for a packet that is divisible into cells, the data unit source 120 may send the SOP cell of the data unit 110 down the control path 132 before having even received other cells of the data unit 110. Middle-of-packet cells (and optionally the SOP cell) may also be sent down the data path 122 before the end-of-packet ("EOP") cell is received. Moreover, portions of different data units 110 (e.g. having been received concurrently on different ports) may be sent down the data path 122 before either of the different data units 110 have been fully received. Thus, for example, cells from different data units 110 may be interleaved amongst each other as they are sent down the data path 122.

In an embodiment, the data unit source 120 and packet processor 130 may be implemented by, or as part of, one or more ASICs or FPGAs within the implementing apparatus. In an embodiment, the separation of the data unit 110 along two different paths enables hardware designs that leverage different operating frequencies for the circuitry and memory units used along each path, so as to enable the generation of the control information 134 along the control path 132 using higher cost but faster hardware without requiring that hardware to store the entire data unit 110. Of course, there may be any number of other contexts where such separation is useful.

2.3. Merger Component

Through a variety of techniques, including without limitation those depicted in FIG. 1 as described above, control information 134 and payload data 124 arrive, typically asynchronously, at a merger subsystem 140 through two separate paths 122 and 132. A merger subsystem 140 is configured to correlate the control information 134 for a data unit 110 with its payload data 124. The merger subsystem 140 may do so using any suitable technique, such as locating all subunits having a particular packet sequence number. At a suitable time after the control information 134 has been correlated to the payload data 124, the merger subsystem 140 may send the merged data unit 110 to an interconnect 160, from which the merged data unit 110 may proceed to any of a number of destinations 162.

A merger subsystem 140 may receive control information 134 for a data unit 110 in any of a variety of forms, including in the form of a header (e.g. to replace or be inserted into the data unit), a wrapper to be prepended to the data unit 110, or a separate data structure intended to accompany the data unit 110. The control information 134 may include data that explicitly or implicitly identifies at least one path or target component 162 to which the data unit should be forwarded for further processing. The control information 134 may optionally include a variety of other information, including information conventionally found in a header, extra processing instructions intended for downstream components of the implementing apparatus, and so forth.

A merger subsystem 140 merges the control information 134 with the data unit 110 (or data unit portions), either by modifying the data unit 110 itself (e.g. prepending the control information 134 to the data unit 110 or a SOP cell for data unit 110, or inserting the control information 134 within the data unit 110), or by sending the control information 134 adjacent to the data unit 110 when dispatching the data unit 110 to its next destination 162.

A merger subsystem 140 may be implemented by, or as part of, one or more ASICs or FPGAs, which may be the same as or different from the hardware that implements the control path 132 and data path 122. In an embodiment, the merger subsystem 140 may include any number of memories of any suitable size, in which data units 110 may be stored temporarily (i.e. buffered and/or queued) while waiting for associated control information 134 to be received from the control path 132. In an embodiment, the merger subsystem 140 may include a scheduler component configured to determine when to release data units 110 from the memory or memories in which they are buffered, to the interconnect 160.

In an embodiment, when a merger subsystem 140 receives control information 134, the merger subsystem 140 sends some or all of the control information 134 to a scheduler 150. The scheduler uses some or all of the control information 134 to decide when to dispatch the data unit 110 to a next destination component 162. At or before the appropriately scheduled dispatch time, the merger subsystem 140 utilizes identification data within the control information 134, such as a packet identifier embedded within the header by the sending network device or the data unit source 120, to locate and read the data unit 110 (or portions of the data unit 110) that is associated with the control information 134 from the one or more memories of merger subsystem 140. The merger subsystem 140 then merges the control information 134 and payload 124 as described above.

Examples of a merger subsystem 140 include, without limitation, the merger subsystems 140 described in U.S. Ser. No. 15/433,825, entitled "Scalable Ingress Arbitration for Merging Control and Payload," by Matthews, et al., filed Feb. 15, 2017, the entire contents of which are hereby incorporated by reference for all purposes as if set forth in their entirety herein.

2.4. Interconnect Component

The merger subsystem 140 sends the merged data unit 110 out via an interconnect component 160, also referred to as interconnect 160, to the destination component indicated by the control information 134. The interconnect 160 may be any component, such as a crossbar, capable of accepting a data unit 110 as input and sending or writing that data unit 110 as output to one or more identified destinations 162 out of a plurality of different destinations 162 that are coupled to the interconnect 160.

The interconnect component 160 may comprise one or more outgoing interfaces for each possible destination component 162 for a merged data unit 110. Destination components 162, illustrated as destinations 162a-162n, may include, for example, processing components, routing decision components, packet inspection components, traffic action control components, tracking or reporting components, traffic managers, individual egress ports, egress port groups, queues or buffers for such components, other data handling systems 100, or any other suitable destination component. Examples of some destination components are described in, without limitation, U.S. application Ser. Nos. 14/958,830, 14/973,541, 15/045,039, and 62/289,199, the entire contents of each of which are hereby incorporated by references for all purposes, as if set forth in their entirety herein.

For example, in an embodiment comprising a data handling system 300 in an ingress processing stage, the interconnect 160 may be configured to accept data via a single input and output that data in parallel to multiple receivers, such as egress stage traffic managers. As another example, in an embodiment comprising a data handling system 300 in an egress processing stage, the interconnect 160 may be a point-to-point transport configured to accept data via a single input and output that data to a port group.

The interconnect 160 receives merged data units 110 from one or more merger components 140 and directs the merged data units 110 out the appropriate interfaces to reach the destination component(s) 162 identified by the associated control information 134. The interconnect component 160 may be configured to send a single data unit 110 out on one interface (unicast) or configured to send a copy of the data unit 110 to each of any number of interfaces (multicast), depending on how many destinations 162 are identified by the control information 134. The interconnect 160 can send traffic out each interface concurrently.

Depending on the embodiment, the interconnect 160 receives and dispatches data units 110 as separate portions (e.g. the individual cells of a packet) or all at once. In at least one embodiment, portions of a data unit 110 may be dispatched even before the merger subsystem 140 has received the entire data unit 110 (e.g. for data flows with large packets where the control information 134 is generated from the SOP cell before the EOP cell is received or completes the data path 122).

In an embodiment, a destination 162 may be another processing component coupled to the interconnect 160 via circuitry through which signals representing the data units 110 sent from the interconnect 160 are received directly by the processing component. In an embodiment, a destination 162 may be a processing component configured to read data units 110 sent by the interconnect 162 from a memory (e.g. a register). Thus, the outgoing interface of interconnect 160 that corresponds to this destination 162 is configured to write data units 110 to this memory rather than send the data directly to the corresponding processing component.

After dispatch from the interconnect component 160, the data units are processed by the identified destination component(s) 162 in accordance with their respective control information 134. The data units 110 are eventually, if not dropped, sent out via one or more outgoing ports of the network device to other nodes in the network. In some embodiments, some or all of the control information 134 may be removed before sending the data units 110 from the network device.

2.5. Example Data Handling System with Cell-Based Traffic

Figure 2:
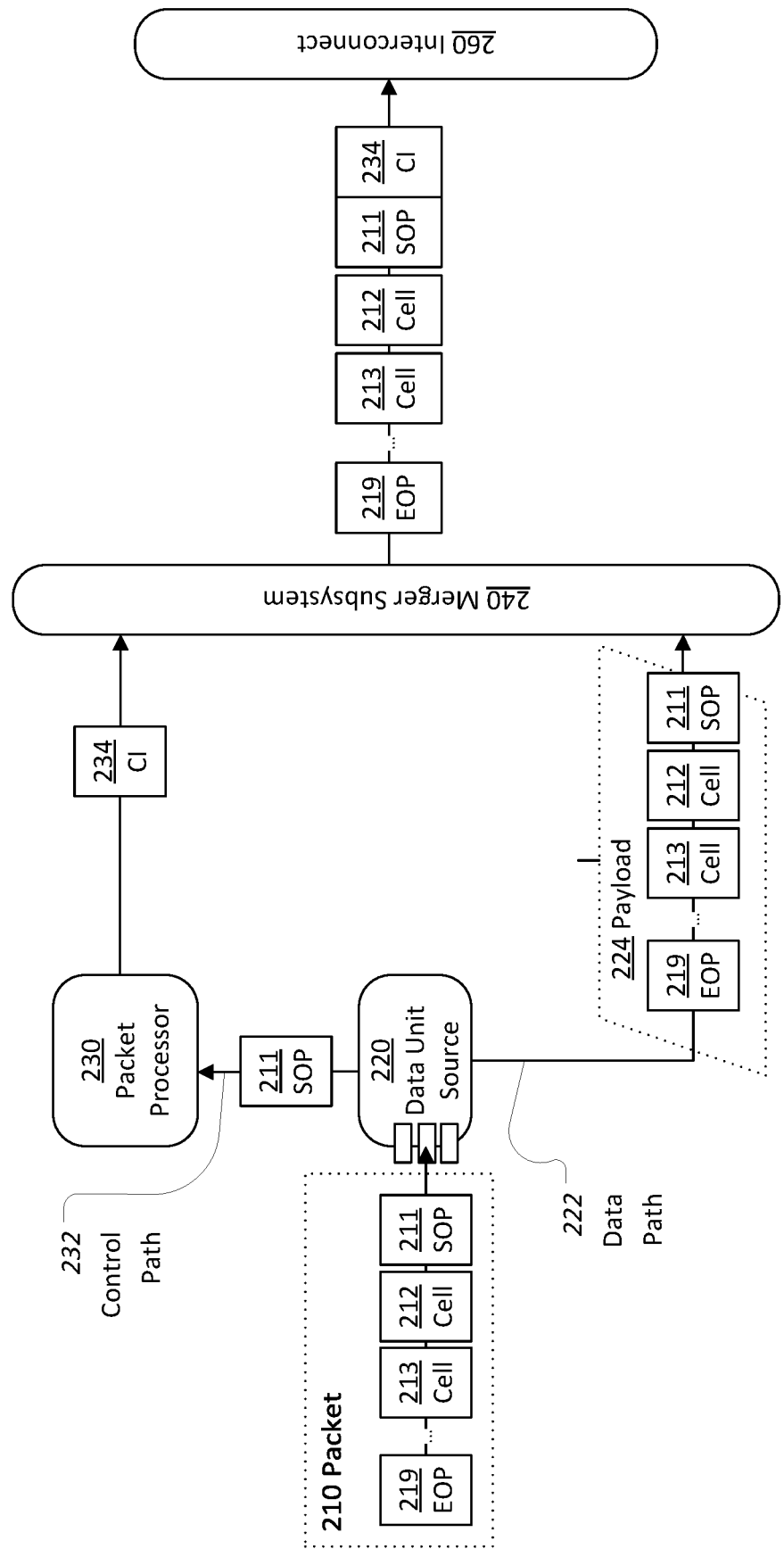
FIG. 2 is an illustrative view of various aspects of an example data handling system handling cell-based traffic.

FIG. 2 is an illustrative view of various aspects of an example data handling system 200 handling cell-based traffic, according to an embodiment. Data handling system 200 is in many aspects similar to data handling system 100 of FIG. 1, though certain details have been omitted for clarity. For instance, data unit source 220 of system 200 is similar to data unit source 120, packet processor 230 of system 200 is similar to packet processor 130, merger subsystem 240 of system 200 is similar to merger subsystem 140, and interconnect 260 of system 200 is similar to interconnect 160.

However, to better illustrate the flow of a data unit 110 when received as distinct subunits, FIG. 2 illustrates the flow of a packet 210 that is divided into distinct cells 211-219. Cell 211, a SOP cell, is received first at data unit source 220. Data unit source 220 sends SOP cell 211 along control path 232 to packet processor 230, which will generate control information 234 based on SOP cell 211. The control information 234 is then forwarded to merger subsystem 240.

Data unit source 220 also sends the SOP cell 211 along the data path 222. Meanwhile, data unit source 220 may receive, in turn, cell 212, cell 213, and any number of additional cells of packet 210, up until receiving an EOP cell 219. Data unit source 220 also sends these cells 212-219 along data path 222, collectively forming the payload 224 for packet 210. Note that, in another embodiment, SOP 211 may be sent only along the control path 232, in which case the SOP 211 is forwarded to the merger subsystem 240 along the control path 232 with the control information 234.

In the depicted example, merger subsystem 240 buffers any cells 211-219 that are received from the data path 222 before receiving control information 234 from the control path 232. The buffered cells 211-219 cannot be sent until control information 234 is received by and dispatched from merger subsystem 240. Once received by merger subsystem 240, in some embodiments, control information 234 may likewise be buffered until a scheduler subsystem (not depicted) or other resource regulating component determines that resources are available to dispatch SOP 211 and control information 234. At the scheduled time, control information 234 may be prepended to SOP 211, as depicted, or otherwise sent to interconnect 260 in association with SOP 211 and/or any other cell 212-219. In other embodiments, transmission of the packet 210, starting with control information 234 and SOP 211, may begin as soon as the control information 234 has been received.

Once SOP 211 has been dispatched to interconnect 260, merger subsystem 240 may dispatch any cells 212-219 that are buffered in memory at merger subsystem 240, in turn. Moreover, merger subsystem 140 may immediately dispatch any cells 212-219 received after SOP 211 and control information 234 have been dispatched, without necessarily buffering these cells 212-219. Nonetheless, these cells 212-219 may also be buffered at merger subsystem 240 for some time while waiting for dispatch of any buffered preceding cells of packet 210 and/or while waiting for resources to become available.

Note that, while payload 224 is depicted as comprising all cells of packet 210, the term payload or payload data as used herein may actually refer to any distinct portion of the packet 210 that is sent along the data path 222. For instance, cell 212 may, by itself, be considered a payload for packet 210, as may cells 213-219, or any combination thereof.

In an embodiment, any number of additional cells 212-219 may be sent along the control path 232 for analysis when generating control information 234, and thus need not necessarily be communicated along data path 222 if they are communicated to merger subsystem 240 along the control path 232.

In an embodiment, data unit source 220 does not necessarily receive cells 211-219 one after another, but rather may receive any number of other cells for other packets in between receiving each of cells 211-219. Likewise, the merger subsystem 240 may dispatch any number of other cells from other packets in between dispatching each of cells 211-219.

Further note that system 200 illustrates only one of many possible arrangements of components configured to handle data flows composed of distinct subunits. Other arrangements may include fewer, additional, or different components, and the division of work between the components may vary depending on the arrangement. More generally, each cell 211-219 may be a portion of data associated with some context (as opposed to packet 210), which is considered to be in an inactive state until control information 234 is received, and in an active state (allowing dispatch of the associated data) thereafter.

2.6. Shared Packet Processor

Figure 3:
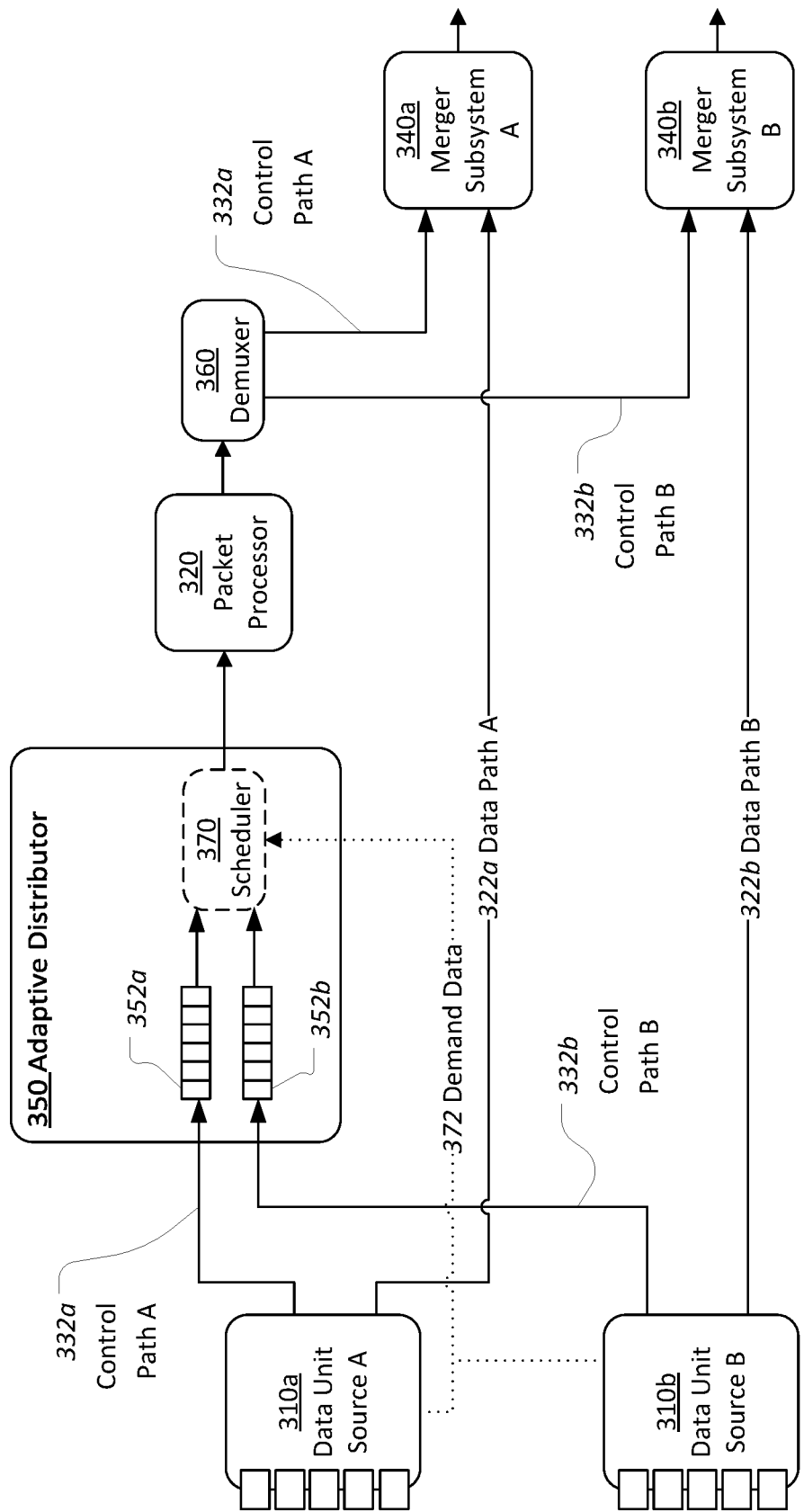
FIG. 3 illustrates a modified data handling system comprising multiple data unit sources coupled to a common packet processor that is shared across their respective control paths.

FIG. 3 illustrates a modified data handling system 300 comprising multiple data unit sources 310 coupled to a common packet processor 320 that is shared across their respective control paths 332. As with data handling system 100, data handing system 300 is a component of an apparatus such as a network device, comprising any combination of hardware and software configured to implement the various logical components described herein. The forwarding logic of a network device may include any number of processing stages, each comprising one or more data handling systems 300 configured to move data units inside the network device. In an embodiment, for example, there may be ingress and egress processing stages, each including one or more data handling systems 300.

The data unit sources 310, including data unit sources 310a and 310b, may be similar to data sources 120 described above. Data unit sources 310 should each be of a same type of data unit source (e.g. both ingress arbiters or both egress traffic managers). In an embodiment, the data unit sources 310 should be configured to receive data units from different sets of components. For instance, each data unit source 310 may be coupled to a different logical or physical port group.

As with data unit source 110, each data unit source 310 has its own distinct control path 332 and data path 322, through which they eventually send the data units that they respectively receive. As depicted, data paths 322 include data paths 322a and 322b, coupled to data unit sources 310a and 310b, respectively. Each data path 322 is similar to data path 122, and carries the payload portion of the data units sent by data unit sources 310. Each data path 322 is coupled to a different merger subsystem 340. Merger subsystems 340 include merger subsystems 340a and 340b, coupled to data paths 322a and 322b, respectively.

Control paths 332 include the depicted control paths 332a and 332b, along which data unit sources 310a and 310b respectively send the control portions of the data units that they receive. Control paths 332 are both coupled to a common packet processor 320, which is similar to packet processor 120. Packet processor 320 receives the control portions of the data units from the multiple control paths 332, interleaved together. In fact, in an embodiment, packet processor 320 need not be able to discern over which control path 332 a given data unit was received.

Packet processor 320 produces control information, such as control information 134, based upon the data unit portions that it receives. Packet processor 320 then sends this control information to a demuxer 360, which may be included in the packet processor 320 or external to the packet processor 320, depending on the embodiment. Based upon metadata associated with the control information, such as a control path identifier, the demuxer splits the control information back into multiple paths 332, with the control information for any data units that were originally sent via control path 332a continuing along demuxed control path 332a, and the control information for any data units that were originally sent via control path 332b continuing along demuxed control path 332b.

Merger subsystems 340a and 340b are coupled to the demuxer 360 via, respectively, the demuxed control paths 332a and 332b. The merger subsystems 340 thus receive only the control information for the data unit source 310 to which they correspond. The merger subsystems 340 merge the control information for each data unit with the corresponding payload data received over their respectively coupled data path 322. The merger subsystems 340 behave, in this respect, in the same manner as merger subsystem 140.

Finally, merger subsystems 340 output the merged data units. The component or components to which they output the merged data units may differ depending on the embodiment. However, in general, the outputs of the merger subsystems 340 are coupled to circuitry configured to use the control information to determine other components and/or interfaces (i.e. other destinations) to which to send the data unit. For instance, in an embodiment, each merger subsystem 340 may output merged data units to a different interconnect, as described previously. In another embodiment, merger subsystems 340 may each be connected to the same interconnect. In another embodiment, merger subsystems 340 may be connected to multiple interconnects, which may be unique to each merger subsystem 340, or shared amongst some or all of the merger subsystems 340.

2.7. Adaptive Distributor

In an embodiment, data unit sources 310 may from time to time output data units—or more specifically the control portions of the data units—along the control paths 332 at a rate that, in aggregate, exceeds the rate at which packet processor 320 can process the data units. To avoid or at least reduce the dropping of data units that cannot be processed by the packet processor 320 during these periods, the control paths 332 may converge at a component comprising a buffer memory 352 configured to temporarily store data units (or at least their control portions) while they await processing by the packet processor 320. When packet processor 320 is ready for another data unit—which, depending on the embodiment, may be after a fixed number of clock cycles, when packet processor 320 signals that it is ready, etc.—a next data unit is released from the buffer memory 352 to packet processor 320.

In the depicted embodiment, such a buffer memory 352 is found in adaptive distributor 350. Different buffering techniques may be utilized depending on the embodiment. For instance, buffer memory 352 may be a simple first-in-first-out ("FIFO") buffer, from which data units are released to packet processor 320 in the order they arrive, regardless of their data unit source 310 or other characteristics. Or, as depicted, buffer memory 352 may be organized into separate queues 352a and 352b corresponding to data unit sources 310a and 320b, respectively. In yet other embodiments, data units in buffer memory 352 may be organized in other manners—for instance, there may be more than one queue per data unit source 310, each storing data for data units having different characteristics. Or, there may be multiple queues corresponding to different data unit characteristics, but these multiple queues may be shared across data unit sources, such that all data units having a certain characteristic would be buffered in a certain queue 352a regardless of their data unit source 310.

In an embodiment, to further avoid or at least reduce the dropping of data units that cannot be processed by the packet processor 320 during periods of high traffic, the adaptive distributor 350 may support backpressure based on the current FIFO occupancy level and/or other factors. The adaptive distributor 350 may further be configured to indicate this backpressure to the data unit source 310, which may in turn be configured to slow the rate at which data units are sent.

In embodiments where the buffer memory 352 is other than a simple single FIFO buffer, a scheduler 370 is included in the adaptive distributor 350. The scheduler 370 is configured to select which data unit to release to the packet processor 320 whenever the packet processor 320 is ready to process another data unit. The scheduler 370 may select a next data unit in a variety of manners. For instance, in an embodiment, the scheduler 370 is configured to select a specific queue 352*a* or 352*b* from which to release the next data unit. Queues 352*a* and 352*b* may be, for instance, FIFO-based queues. Hence, by selecting the next queue 352*a* or 352*b*, scheduler 370 selects the next data unit to release (i.e. the data unit at the head of the selected queue).

The scheduler 370 may use any of a number of policies to determine which queue to select. For instance, the scheduler 370 may implement a round-robin policy, in which the scheduler continually alternates between non-empty queues each time the packet processor 370 is ready for a new data unit.

Or, the scheduler 370 may implement a weighted round-robin distribution policy, in which the scheduler 370 assigns a weight to each queue, and ensures that the number of data units released from each non-empty queue over a certain period of time is proportional to the weight of that queue. Hence, if queue 352*a* had a weight of 2, and queue 352*b* had a weight of 1, the scheduler 370 would release two data units from queue 352*a* for every one data unit released from queue 352*b*, assuming both queues are not empty. The scheduler 370 may then, for example, cycle through non-empty queues, releasing the designated number of data units from that queue each time it arrives at the queue.

As yet another alternative, the scheduler 370 may implement a probabilistic policy. The scheduler 370 may again assign weights to each queue. However, instead of guaranteeing that the number of data units released from a given queue over a certain period of time is proportional to the given queue's weight, the scheduler randomly selects a queue from which to release the next data unit, in a manner such that the probability of selecting a given queue is proportional to its weight. For example, the scheduler 370 might select a random number between 0 and 1. If a first queue has a weight of 3 while a second queue is weight of 1, then a random number below 0.75 might map to a selection of the first queue, and any higher number might map to a selection of the second queue. In this manner, the scheduler may achieve the result of favoring one queue over another over time, without being susceptible to potential performance issues that occasionally arise when selecting data units in accordance to a fixed pattern.

In some embodiments, the scheduler may adapt its policy in accordance to information about the current operations of system 300 and/or the network device at large. Such information is referred to herein as demand data, and may include, for instance, information about how full various memory resources are, the sizes of certain queues both within and without adaptive distributor 350, the amount of traffic received over certain ports or groups of ports, and so forth. The demand data may be generated internally within adaptive distributor 350 and/or may be received as demand data 372 from the data unit sources 310, typically via separate channels than the control paths 332.

More specific examples of demand data may include, without limitation, a number of data units currently buffered at each data unit source, a percentage of buffer space currently occupied within each data unit source, a current rate of arrival for data units at each data unit source, a current rate of arrival for a specific port or interface of data unit source 310, lengths of one or more queues within the data unit source 310, and lengths of queues 352*a* and 352*b*. Moreover, averages of these metrics over a recent period of time may be used as demand data, including a weighted moving average.

The metrics may be utilized in a number of ways to determine the current distribution policy of the adaptive distributor 350. For instance, one or more of the above metrics associated with a specific data unit source may be provided as input to a function for calculating a weight for that data unit source. Or, as another example, weights or policies may be mapped to specific ranges of values for these metrics.

In an embodiment, a demand score is generated for each data unit source 310 or queue 352. The demand score may be, for example, a function of one or more of the above metrics. The demand score may also or instead be calculated by quantizing one or more of the metrics. For instance, various ranges of a metric may be mapped to different demand scores.

The combination of demand scores of the different sources 310 or queues 352 may be used to lookup a distribution action mapped to that combination of demands scores in a lookup table. There may be a variety of different lookup actions. For instance, one lookup action may be to adjust weights associated with the different queues 352. Another distribution action may be to send a message to one or more data unit sources 310 to speed up or slow down transmission of data units. For instance, such a message may specify a rate at which data units should be sent, a "state" that indicates a rate to the data unit, or to pause or resume transmission, depending on the embodiment. Yet another distribution action may be to set or change a minimum or maximum guaranteed release rate for a queue 352. In an embodiment, such a table may be user configurable for an adaptive distributor 350.

In some embodiments, data units may be released from the middle or even end of the queues 352*a* and 352*b* under certain circumstances. In an embodiment, one or more characteristics of a data unit may be utilized to determine when to release that data unit. For instance, a data unit may be classified as a priority data unit on account of its source, destination, service class, or other metadata. Scheduler 370 may be configured to select priority data units ahead of other data units a certain amount of the time, either by using a separate priority queue, or any other suitable means.

In an embodiment, the buffer memory 352 at the adaptive distributor 350 may become full. At such times, or in anticipation of such times, the scheduler 370 may send a command to one or both of the data unit sources 310 to slow down the rate at which they send data units, or even pause delivery of data units. This may, in turn, cause the data unit sources 310 to begin dropping data units, depending on how much buffer room is available at the data unit sources 310.

2.8. Shared Data Path Resources

According to an embodiment, a data handling system may also or instead share one or more resources across a plurality of data paths, in similar manner to the way in which a packet processor is shared on the control path. The data paths may converge at a common distribution component that behaves in similar manner to adaptive distributor 350 in regulating the flow of payload portions to some shared resource, such as a processor or buffer. The payload portions are then demuxed after passing through the resource and sent to the appropriate merger subsystem.

Such a data handling system may or may not include a shared packet processor on the control path, depending on the embodiment. In some embodiments, a first data handling system having a shared data path resource may coexist in the same device, or even the same processing stage, with a second data handling system having a shared control path packet processor. In other embodiments, a data handling system having a shared data path resource may be used in a network device entirely without a data handling system having a shared control path packet processor.

2.9. Miscellaneous

System 300 illustrates only one of many possible arrangements of components configured to provide the functionality described herein. Other arrangements may include fewer, additional, or different components, and the division of work between the components may vary depending on the arrangement.

For example, although only two data unit sources 310 are depicted in FIG. 3, there may in fact be any number of data unit sources 310, each having their own control path 332, data path 322, and merger subsystem 340. Each of their control paths 332 may nonetheless share a single packet processor 320, and be routed through a single adaptive distributor 350.

In an embodiment, adaptive distributor 350 may be any component capable of buffering data units, regardless of whether it includes a scheduler 370 and/or the ability to adapt the policy by which it selects data units to send to packet processor 320.

In an embodiment, an adaptive distributor 350 may be coupled to multiple packet processors 320, and include one or more schedulers 370 for selecting data units to send to the packet processors 320. For instance, there may be a group of two or more packet processors 320 shared amongst two, three, or any other number of data unit sources 310, and adaptive distributor 350 may manage the dispatch of data units to these packet processors 320.

In an embodiment, individual data unit sources 310 may be coupled to more than one packet processor 320. Different data units may be assigned to different packet processors 320 for processing, based on metadata associated with the data units. For each packet processor, a data unit source 310 may have its own control path 332 and data path 322. However, multiple data unit sources 310 may nonetheless be coupled to the same packet processor 320. That is, for example, data unit source 310a and data unit source 310b may both send data units (or the control portions thereof) that have a first characteristic to a first shared packet processor 320 via a first control path 332, data units that have a second characteristic to a second share packet processor 320 via a second control path 332, and so forth.

More generally, the techniques described herein may be used in any context in which data units are processed using a control path and data path. For illustrative purposes, examples of such contexts are described in this section and throughout the application. However, the inventive techniques need not be limited to such contexts.

For simplification, the packet processor, adaptive distributor, and other components are on occasion described herein as acting upon or with respect to the data unit, when in fact only a portion of the data unit may be sent to or otherwise available to the component. For instance, the adaptive distributor may be said to buffer or release the data unit, when in fact only the data unit control portion is available to the adaptive distributor. In such contexts, it will be understood that the information about the data unit that is actually available to the component is a representation of the data unit to that component. Any actions described herein as having been taken by the component on or with respect to the data unit may occur with respect to the representation of the data unit, and not necessarily the complete data unit.

Figure 4:
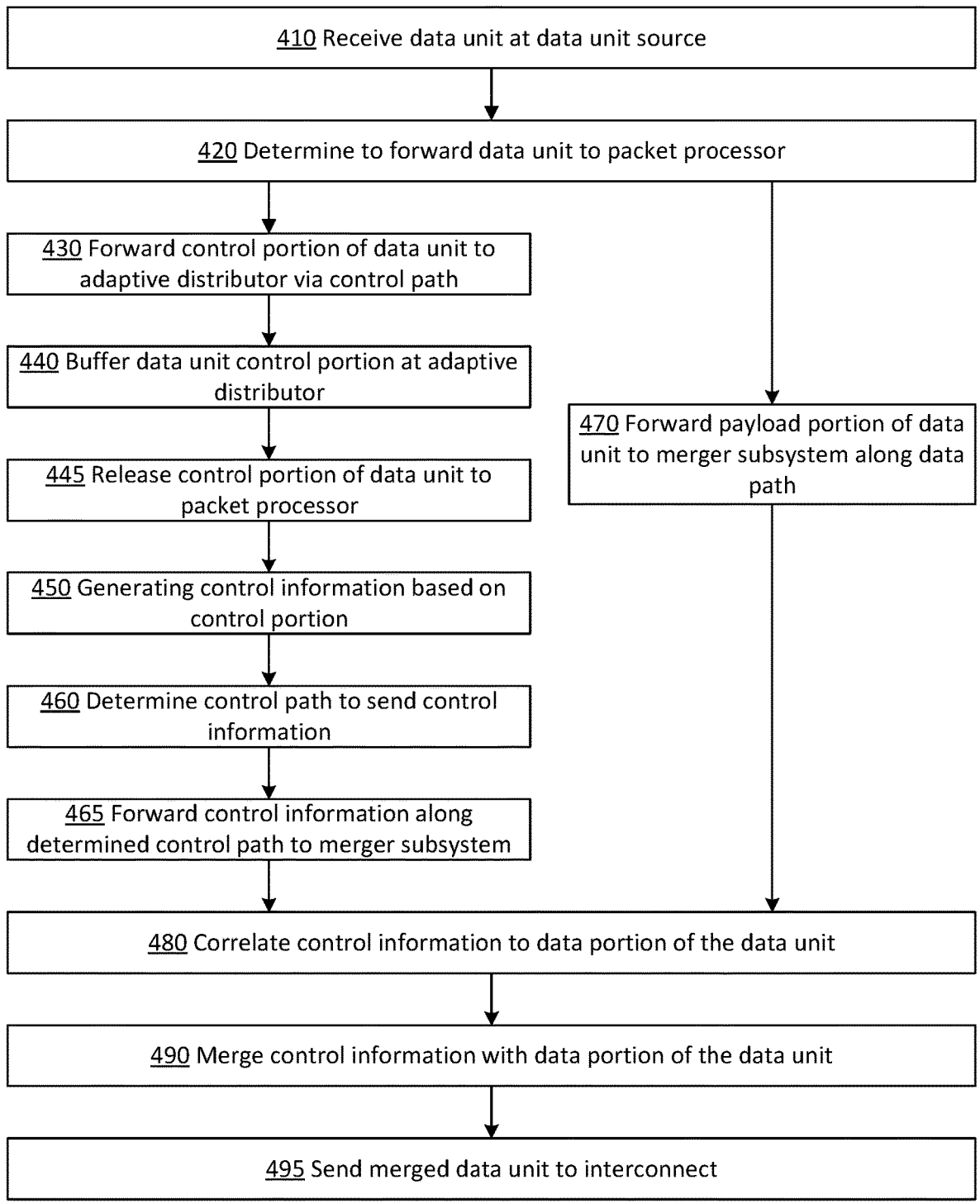
FIG. 4 illustrates an example flow for forwarding a data unit along control and data paths.

3.0. FUNCTIONAL OVERVIEW 3.1. Forwarding a Data Unit Along Control and Data Paths FIG. 4 illustrates an example flow 400 for forwarding a data unit along control and data paths, according to an embodiment. The various elements of flow 400 may be performed in a variety of systems, including systems such as system 300 described above. In an embodiment, each of the processes described in connection with the functional blocks described below may be implemented using one or more integrated circuits, computer programs, other software elements, and/or digital logic in any of a general-purpose computer or a special-purpose computer, while performing data retrieval, transformation, and storage operations that involve interacting with and transforming the physical state of memory of the computer.

Block 410 comprises receiving a data unit, such as a packet, at a data unit source, such as an ingress arbiter, traffic manager, or other component of a network device. The data unit may be received via a port, interconnect, or any other circuitry. The data unit need not be received in a single instance, but rather the data unit source may receive portions of the data unit, such as cells, over time.

Block 420 comprises determining to forward the data unit to a packet processor. The determination may be made at varying times depending on the embodiment. For example, in an embodiment, the determination is made by queueing logic within the data source. The data unit source may buffer data units that have been received in block 410, and arrange those data units in queues. The data unit source may determine to forward a new data unit from the head of a queue to a packet processor once every certain number of time slots. In other embodiments, various scheduling logic may be utilized to determine when to forward a buffered data unit. In yet other embodiments, the determination to forward a data unit may be made as soon as the data unit is received. The determination may, in some embodiments, include a determination of whether to drop the data unit instead of forwarding the data unit (e.g. if the data unit is malformed, or has a characteristic for which the data unit source is required to drop the data unit on account of resource overutilization).

In an embodiment, the determination to forward a data unit is made after the data unit is linked to a queue, which generally requires receiving an EOP portion. The linking may involve various checks on the data unit to determine whether to drop the data unit. In other embodiments, the determination to forward a data unit may be made before the data unit is fully received.

Block 430 comprises forwarding a control portion of the data unit from the data unit source to an adaptive distributor via a control path. For instance, in cell-based embodiments, this may entail sending the SOP cell of the data unit. Optionally, instead of sending the entire SOP subunit of the data unit, block 430 may involve stripping the SOP subunit of any non-header data and forwarding only the header data to the adaptive distributor.

Block 440 comprises buffering the data unit control portion in a memory coupled to the adaptive distributor. As previously explained, the adaptive distributor may receive control portions of data units from a number of different control paths, and in some instances may receive data for more data units than can be forwarded to the packet processor in a given time period. The adaptive distributor may therefore include or be coupled to a buffer memory in which the data unit control portions are temporarily stored as they are received.

Block 445 comprises determining to release the control portion of the data unit to the packet processor. The adaptive distributor may include queueing and/or scheduling logic configured to make this determination. For instance, the data unit control portions may be arranged in one or more queues. Once each time slot, the adaptive distributor may determine to release the head data unit control portion of a queue to the packet processor. The data unit therefore would gradually work its way from the tail to the head of a queue over time, and eventually be released. In an embodiment, if there are more than one queue, a scheduler may select which queue to release the data unit from. Example policies for selecting which queue to release the data unit from are described elsewhere herein.

Block 450 comprises the packet processor generating control information based on the control portion. The control portion may include a variety of information, such as destination and source addresses, data unit type or classifier information, timestamps, and so forth. The packet processor may perform a variety of rule-based and/or hard-coded operations with respect to this information, the results of which may form the control information.

The control information generally indicates a destination for the data packet, such as a destination component, queue, buffer, memory location, port, and/or other suitable destination. The control information may further, for instance, include information already in the data unit (e.g. addressing information, priority data, or labels in the header of the data unit), replace such information in the data unit (e.g. a new destination address or a revised priority level), or be additive with respect to the information in the header (e.g. internal markings, path information, tracking information, a next internal destination component to process the data unit, other handling instructions, etc.).

Block 460 comprises determining a control path to send the control information down. For instance, the packet processor may include or be coupled to a demuxer configured to utilize metadata associated with the data unit control portion to determine which control path the data unit control portion arrived on. Corresponding departure circuitry for this control path, also referred to as the demuxed control path, is coupled to the demuxer.

Block 465 comprises forwarding the control information along the determined demuxed control path to a merger subsystem. The control information may be sent by itself, or embedded in the data unit control portion. In an embodiment, the data unit control portion may optionally be buffered at the merger subsystem to await merger with its payload portion.

Block 470 comprises forwarding a payload portion of the data unit down a data path to the same merger subsystem that the control information will be sent. The data path may be hard-wired to the same merger subsystem as the demuxed control path. The payload portion of the data unit may be sent all at once, or sent as separate portions over time, potentially interleaved with portions of other data units.

Block 470 may be performed at least partially concurrently with blocks 430-465. For example, after the first portion of the data unit is forwarded along the control path, the remaining portions (and possibly the first portion as well) may be forwarded along the data path. The adaptive distributor and packet processor may introduce some delay in the control path, such that some or all of the payload portions of the data unit sent down the data path may arrive before the control information. Accordingly, the merger subsystem may include one or more buffer memories to store the payload portion of the data unit while waiting for the control information.

Block 480 comprises, at the merger subsystem, correlating the control information to the payload portion of the data unit. There will be generally be some identifier within or associated with each data unit portion, such as a sequence number, by which the control information and the payload portions may be correlated at the merger subsystem.

Block 490 comprises merging the control information with the payload portion. Depending on the embodiment, this may comprise pre-pending the control information, linking the control information, or other suitable steps. In an embodiment, the "merger" is accomplished by simply sending the control information followed by the remainder of the data unit in block 495.

Block 495 comprises sending the merged data unit from the merger subsystem to an interconnect. The merged data unit may be sent at any suitable time, such as when the control information is received, when the EOP portion of the data unit is received, at a time scheduled by a scheduler associated with the merger subsystem, and so forth. The merged data unit may be sent all at once, or sent as separate portions over time, potentially interleaved with portions of other data units.

In an embodiment, block 480-495 are performed at substantially the same time. For instance, a scheduler may schedule the data unit for release after its control information has been received. At the scheduled time, it may send the control information, search for other buffered, portions belonging to the data unit, and send those portions as well.

The interconnect to which the data unit is sent may be any suitable component for sending the data unit to a destination indicated by the control information. The techniques described herein are not limited to any specific type of interconnect.

Flow 400 illustrates only one of many possible flows for handling a data unit. Other flows may include fewer, additional, or different elements, in varying arrangements. For example, the merger subsystem may employ yet other techniques for sending the data unit with its control information, and this application is not limited to those techniques described in blocks 480-495. As another example, the control path and/or data path may include other processing components not depicted that may change or act upon information in the data unit.

3.2. Sharing a Packet Processor

Figure 5:
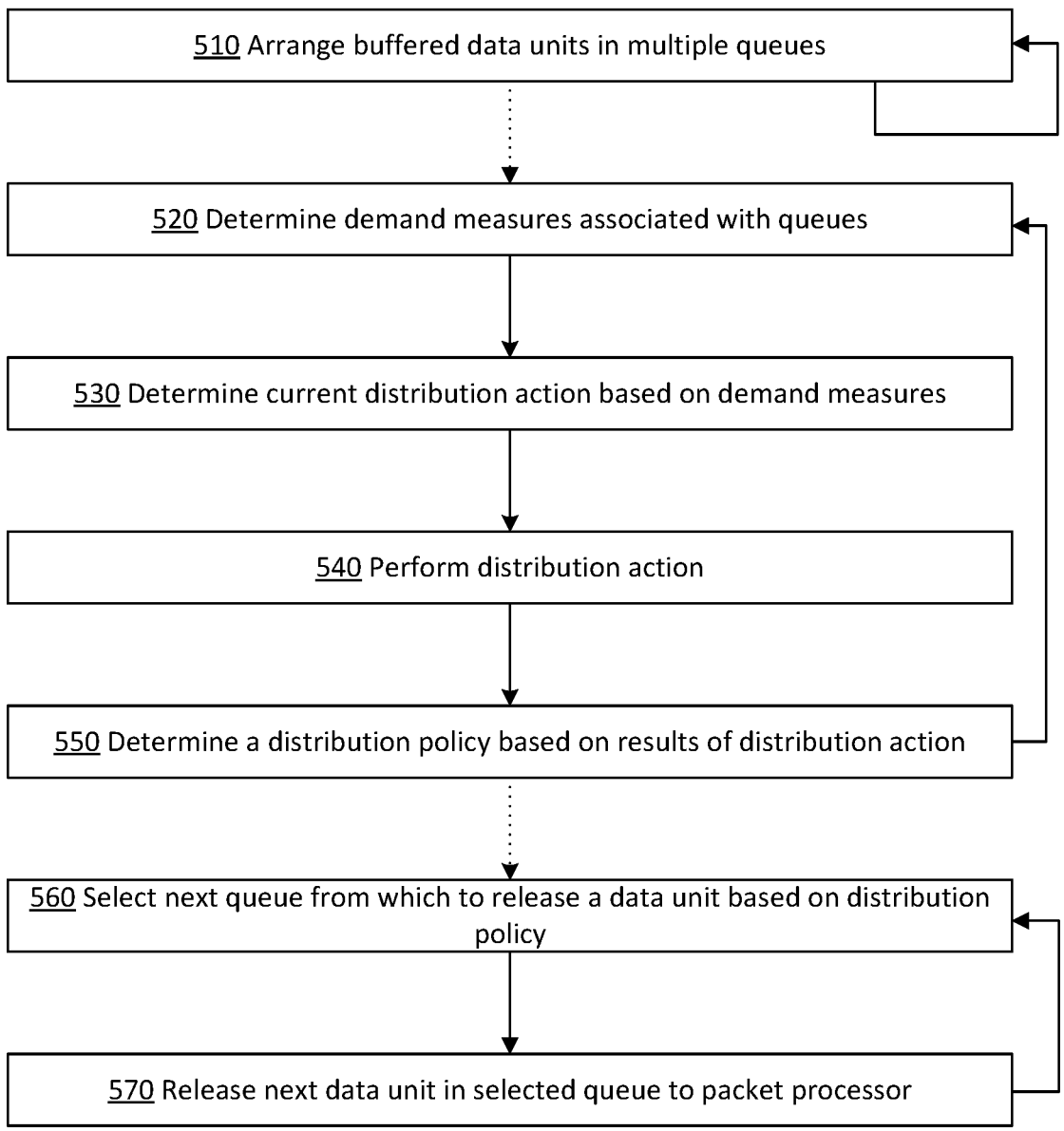
FIG. 5 illustrates an example flow for sharing a packet processor across multiple control paths.

FIG. 5 illustrates an example flow 500 for sharing a packet processor across multiple control paths, according to an embodiment. The various elements of flow 500 may be performed in a variety of systems, including systems such as system 300 described above. In an embodiment, each of the processes described in connection with the functional blocks described below may be implemented using one or more integrated circuits, computer programs, other software elements, and/or digital logic in any of a general-purpose computer or a special-purpose computer, while performing data retrieval, transformation, and storage operations that involve interacting with and transforming the physical state of memory of the computer.

Flow 500 is performed at a component such as an adaptive distributor as described herein. In an embodiment, flow 500 may be performed at least partially concurrently with one or more iterations of flow 400.

Block 510 comprises arranging buffered data units in multiple queues. For instance, as the control portions of the data units arrive over control paths at the adaptive distributor and are buffered therein, the data units may be organized into queues associated with their control paths and/or with various characteristics of the data units (e.g. source port or group of ports, type of data unit, service class, priority level, etc.).

Block 510 may, for instance, be the result of the performance of block 440 over multiple iterations of flow 400, or may occur in other contexts. Block 510 is performed on an ongoing basis, even as other blocks of flow 500 are performed.

Block 520 comprises determining demand measures associated with the queues. In an embodiment, one or more demand measures may be determined intrinsically, based on a characteristic of the queues themselves. For instance, a demand measure may be the size of a queue, a moving average of the size of a queue, a rate at which data units are being released from a queue, etc. An accounting mechanism within the adaptive distributor may track such measures.

In an embodiment, one or more demand measures may be determined externally, by a component other than the adaptive distributor. For instance, a data unit source coupled to each control path may maintain an accounting mechanism that tracks various metrics associated with the operations of the data unit source. Such metrics may include rates at which data units, or certain classes of data units, are arriving at various interfaces of the data unit source, amounts of buffer space within the data unit source being utilized for the data units, queue sizes within the data unit source, moving averages of the foregoing, and so forth.

In an embodiment, one or more demand measures may be determined by yet other components of a system in which the adaptive distributor is operating. In any case, the adaptive distributor may read these external demand measures from a memory to which they are written and/or include an interface for receiving these external demand measures from their various sources.

Block 530 comprises determining a current distribution action based on the demand measures associated with the queues. The distribution action may take a variety of forms, depending on the embodiment. For instance, the distribution action may involve adapting a new distribution policy, changing weights associated with a policy, sending instructions to a data unit source to speed up or slow down the rate at which the data unit source is sending data units over its control path, and so forth.

The distribution action may be mapped to a specific range, or combination of ranges, of the demand measures. For instance, there may be policy table comprising combinations of demand measure ranges and associated distribution actions. Or, quantized demand scores may be generated as a function of one or more demand measures. Specific combinations of demand scores for specific queues may be mapped to specific distribution actions.

For instance, there may be three different queues for three different control paths that input to the adaptive distributor. Their demand scores may begin at 0, 0, and 0, which is associated with the distribution action of adapting a weighted round-robin distribution policy in which all weights are 1. Over time, due to higher utilization of the queues, the demand scores might change. For instance, the demand scores may be determined to be 2, 1, and 2. Such a demand score may be associated with a distribution action of changing the weights to 2, 1, and 2, so that the first and last queue are released more frequently than the middle queue. The demand scores might change yet again to 3, 2, and 2, which may be associated with a distribution action of instructing the data unit source associated with the first queue to stop sending data units.

Block 540 comprises performing the distribution action, which, again, may involve changing the values of certain weights, adapting a new policy, sending an instruction, or any other suitable action. Block 550 comprises determining a distribution policy based on the results of the distribution action. Generally, this involves reading the policy information from a memory to which it has been written and potentially updated per the distribution action of block 540.

Block 560 comprises selecting a next queue from which to release a data unit based on the distribution policy determined in block 550. For instance, the distribution policy may be a round-robin policy, in which case block 560 may comprise selecting the queue that immediately follows the last selected queue in a round-robin list of queues. As another example, if the distribution policy is a weighted distribution policy, block 560 may comprise determining a repeating schedule of queue selections in which queues are selected with a frequency that reflects their currently applicable weights, if such a schedule does not already exist. Block 560 may further comprise selecting the queue assigned to the current time slot in the schedule.

As another example, the distribution policy may be a probability-based policy, in which case block 560 may comprise generating a random value within a domain of random values and selecting the queue that is mapped to that random value. This may require, in some instances, determining a mapping of random values to queues that reflects the currently applicable weights.

Block 570 comprises releasing the next data unit in the selected queue (i.e. the head of the queue) to a packet processor. Blocks 560 and 570 correspond to blocks 445 and 450 of flow 400.

In some embodiments, flow 500 may return immediately from block 570 to block 560 for selection of a next queue from which to release a next data unit. Or, after a certain amount of time, flow 500 may return to block 520 to begin determining demand measures so that a new distribution action can be taken, if needed. The adaptive distributor may check to see if a new distribution action is to be taken at periodic or other intervals, and/or in response to various triggering events.

In an embodiment, blocks 520-540 are performed asynchronously relative to not only block 510, but also blocks 560-570. For instance, blocks 520-540 may be performed as part of a background process every certain number of clock cycles, whereas blocks 560-570 might be performed once each clock cycle, and block 510 might be performed each time a data unit arrives or departs from the adaptive distributor. Depending on the embodiment, block 550 may be performed using yet another asynchronous process, or in the same process as blocks 520-540, or as blocks 560-570.

Flow 500 illustrates only one of many possible flows for sharing a packet processor. Other flows may include fewer, additional, or different elements, in varying arrangements.

4.0. EXAMPLE EMBODIMENTS

Examples of some embodiments are represented, without limitation, in the following clauses:

According to an embodiment, a network switching apparatus comprises a packet processor; an adaptive distributor; multiple control paths coupled to the adaptive distributor; multiple data paths; multiple data unit sources, each coupled to a different one of the control paths and a different one of the data paths; a demuxer coupled to the packet processor;

and multiple merger subsystems, each coupled to the demuxer and a different one of the data paths.

According to an embodiment, a network switching apparatus comprises: multiple data unit sources; multiple control paths, each control path coupled to a different data unit source; multiple data paths, each data path coupled to a different data unit source; an adaptive distributor coupled to the multiple control paths, the adaptive distributor comprising a buffer memory; a shared packet processor coupled to the adaptive distributor; a demuxer coupled to the shared packet processor; merger subsystems coupled to the demuxer, each merger subsystem further coupled to a different data path of the multiple data paths; wherein the data unit sources are configured to send first portions of data units along the control paths and payload portions of the data units along the data paths; wherein the shared packet processor is configured to generate control information based on the control portions; wherein the merger subsystems are configured to output the data units with the control information generated for the data units.

In an embodiment, the adaptive distributor is configured to schedule the control portions for release from the buffer memory to the shared packet processor based on demand measures associated with the data unit sources.

In an embodiment, the demand measures reflect one or more of: lengths of data unit queues corresponding to the data unit sources in the adaptive distributor, lengths of queues within the data unit sources, arrival rates of the data units at the data unit sources, or buffer space utilization at the data unit sources.

In an embodiment, the adaptive distributor is configured to send instructions to the data unit sources to lower or increase rates at which the data unit sources output the control portions, based on demand measures associated with the data unit sources.

According to an embodiment, a system comprises: data unit sources configured to send different portions of data units down different paths, including control paths and data paths; a shared packet processor configured to input first portions of the data units carried by the control paths, generate control information based on the first portions, and output the control information; merger subsystems configured to receive payload portions of the data units via the data paths, receive the control information generated by the shared packet processor, correlate the control information with the payload portions, and output the data units with the correlated control information.

In an embodiment, the data units are packets, the first portions are start-of-packet cells, and each of the payload portions is a set of one or more cells that includes an end-of-packet cell.

In an embodiment, each data unit source is an ingress arbiter coupled to a plurality of network ports over which the data units are received.

In an embodiment, data unit source is a traffic manager in a network device.

In an embodiment, the control information outputted by the packet processor includes or is embedded in the respective first portions based on which the control information was generated.

In an embodiment, the payload portions also include the first portions.

In an embodiment, the first portions each include packet header information, the packet header information including at least one of: a destination address, a source address, or a packet type.

In an embodiment, the system further comprises: an adaptive distributor coupled to the packet processor and to each of the control paths, the adaptive distributor configured to receive the first portions of the data units via the control paths and determine when to forward the first portions to the packet processor.

In an embodiment, the system further comprises an adaptive distributor configured to: receive the first portions of the data units via the control paths; buffer the first portions of the data units in a buffer memory; arrange the buffered first portions into queues, each of the queues corresponding to a different data unit source of the data unit sources; when the packet processor is ready to generate control information for a new data unit, select one of the queues from which to release a next first portion of a data unit to the packet processor.

In an embodiment, the system further comprises: an adaptive distributor configured to receive the first portions of the data units via the control paths and determine when to forward the first portions to the packet processor, the determining comprising utilizing a policy to select, in a particular time slot, a particular data unit whose first portion is to be released to the packet processor, the policy configured based on demand measures associated with the data unit sources from which the first portions are sent.

In an embodiment, the policy is a weight-based policy, and the weights are calculated based on the demand measures.

In an embodiment, the policy is one of: a round-robin policy, a weighted round-robin policy, or a probability-based policy.

In an embodiment, the adaptive distributor is further configured to adjust the policy over time based on the demand measures.

In an embodiment, the adaptive distributor is configured to adjust the policy based on a table that maps demand scores derived from the demand measures to distribution actions.

In an embodiment, the demand measures reflect one or more of: lengths of data unit queues corresponding to the data unit sources in the adaptive distributor, lengths of queues within the data unit sources, arrival rates of data units at the data unit sources, or buffer space utilization at the data unit sources.

In an embodiment, the system further comprises: an adaptive distributor configured to receive the first portions of the data units via the control paths and determine when to forward the first portions to the packet processor; wherein, based on amounts of data unit portions buffered at the adaptive distributor for specific data unit sources, the adaptive distributor is further configured to send instructions to specific data unit sources to decrease or increase rates at which the specific data unit sources send the first portions to the adaptive distributor.

In an embodiment, the system further comprises a demuxer to which the packet processor outputs the control information, the demuxer coupled to each of the merger subsystems and configured to forward particular control information for a particular data unit to a particular merger subsystem based on metadata associated with the particular control information that indicates a particular control path via which a first portion of the particular data unit was sent.

In an embodiment, each merger subsystem of the merger subsystems is configured to receive at least particular control information outputted by the packet processor, correlate that particular control information to particular payload portions of particular data units received via a particular data path of the plurality of data paths, and send the particular data units with their corresponding particular control information to an interconnect coupled to the merger subsystem.

In an embodiment, the interconnect is configured to output data units to one or more traffic managers.

In an embodiment, the interconnect is configured to output data units to a port group.

In an embodiment, the control information indicates at least one or more destination components for the data units.

In an embodiment, each data unit source is coupled to a different control path of the control paths and a different data path of the data paths.

In an embodiment, the system further comprises multiple groups of data unit sources, each group having a different shared packet processor.

In an embodiment, the system is an integrated circuit that implements a network switching device.

According to an embodiment, a method comprises: from each data unit source of a plurality of data unit sources, sending control portions of data units down a control path and payload portions of the data units down a data path, each data unit source having a unique control path and a unique data path; at a shared packet processor, receiving the control portions from each data unit source via the unique control path of the data unit source; generating control information for each data unit whose control portion is received at the shared packet processor, based on the control portion; sending the control information for each data unit to a particular merger subsystem that is coupled to the unique data path down which a corresponding payload portion of the data unit was sent; for each data unit, at the particular merger subsystem that receives the control information for the data unit, locating a payload portion that corresponds to the control information, and sending the control information and the located payload portion to an interconnect.

In an embodiment, the method further comprises: receiving the control portions from each data unit source at an adaptive distributor deployed between the data unit sources and the shared packet processor; determining when to forward the control portions from the adaptive distributor to the shared packet processor, the determining including forwarding a first control portion of a first data unit before forwarding a second control portion of a second data unit that was received at the adaptive distributor before the first control portion.

In an embodiment, the method further comprises: receiving the control portions from each data unit source at an adaptive distributor deployed between the data unit sources and the shared packet processor; buffering the control portions from each data unit source in a buffer memory of the adaptive distributor; arranging the buffered control portions into queues, each of the queues corresponding to a different data unit source of the data unit sources; when the shared packet processor is ready to generate control information for a new data unit, selecting one of the queues from which to release a next control portion to the packet processor.

In an embodiment, the method further comprises: receiving the control portions from each data unit source at an adaptive distributor deployed between the data unit sources and the shared packet processor; determining when to forward the control portions from the adaptive distributor to the shared packet processor; wherein the determining comprises utilizing a policy to select, in a particular time slot, a particular data unit whose control portion is to be released to the shared packet processor; configuring the policy based on demand measures associated with the data unit sources from which the control portions are sent.

In an embodiment, the method further comprises: adjusting the policy over time based on the demand measures.

In an embodiment, the demand measures reflect one or more of: lengths of data unit queues corresponding to the data unit sources in the adaptive distributor, lengths of queues within the data unit sources, arrival rates of data units at the data unit sources, or buffer space utilization at the data unit sources.

In an embodiment, the method further comprises: receiving the control portions from each data unit source at an adaptive distributor deployed between the data unit sources and the shared packet processor; determining when to forward the control portions from the adaptive distributor to the shared packet processor; based on amounts of data unit portions buffered at the adaptive distributor for specific data unit sources, the adaptive distributor sending instructions to specific data unit sources to decrease or increase rates at which the specific data unit sources send the control portions to the adaptive distributor.

Other examples of these and other embodiments are found throughout this disclosure.

5.0. EXAMPLE IMPLEMENTING SYSTEM

Figure 6:
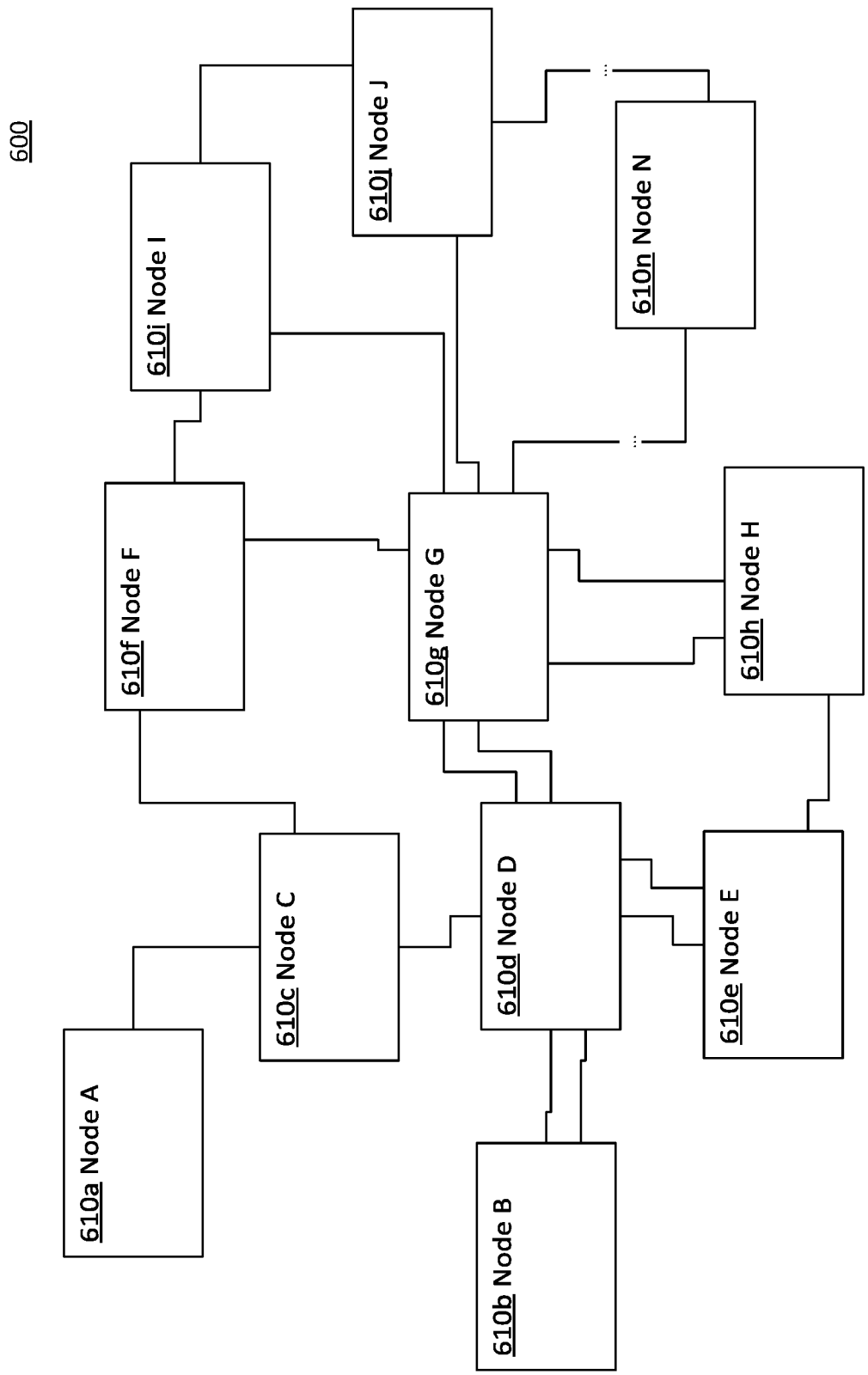
FIG. 6 is an illustrative view of various aspects of an example networking system in which the techniques described herein may be practiced.

FIG. 6 is an illustrative view of various aspects of an example networking system 600, also referred to as a network, in which the techniques described herein may be practiced, according to an embodiment. Networking system 600 comprises a plurality of interconnected nodes 610a-610n (collectively nodes 610), each implemented by a different computing device. For example, a node 610 may be a single networking computing device, such as a router or switch, in which some or all of the processing components described herein are implemented in application-specific integrated circuits (ASICs), field programmable gate arrays (FPGAs), or other integrated circuit(s). As another example, a node 610 may include one or more memories storing instructions for implementing various components described herein, one or more hardware processors configured to execute the instructions stored in the one or more memories, and various data repositories in the one or more memories for storing data structures utilized and manipulated by the various components.

In an embodiment, some or all of nodes 610 may include one or more data handling systems 300. In an embodiment, some or all of the nodes 610 may implement flows 400 and 500, regardless of whether the nodes 610 include all of the components of system 300. In other embodiments, however, the techniques described herein may be practiced without all of the details of FIG. 6.

Each node 610 is connected to one or more other nodes 610 in network 600 by one or more communication links, depicted as lines between nodes 610. The communication links may be any suitable wired cabling or wireless links. Note that system 600 illustrates only one of many possible arrangements of nodes within a network. Other networks may include fewer or additional nodes 610 having any number of links between them.

5.1. Network Packets

While each node 610 may or may not have a variety of other functions, in an embodiment, each node 610 is configured to send, receive, and/or relay data to one or more other nodes 610 via these links. In general, data is communicated as series of discrete units or structures of data represented by signals transmitted over the communication links.

Different nodes 610 within a network 600 may send, receive, and/or relay data units at different communication levels, or layers. For instance, a first node 610 may send a data unit at the network layer (e.g. a TCP segment) to a second node 610 over a path that includes an intermediate node 610. This data unit will be broken into smaller data units ("subunits") at various sublevels before it is transmitted from the first node 610. For example, the data unit may be broken into packets, then cells, and eventually sent out as a collection of signal-encoded bits to the intermediate device. Depending on the network type and/or the device type of the intermediate node 610, the intermediate node 610 may rebuild the entire original data unit before routing the information to the second node 610, or the intermediate node 610 may simply rebuild the subunits (e.g. packets or frames) and route those subunits to the second node 610 without ever composing the entire original data unit.

When a node 610 receives a data unit, it typically examines addressing information within the data unit (and/or other information within the data unit) to determine how to process the data unit. The addressing information may be, for instance, an Internet Protocol (IP) address, MPLS label, or any other suitable information. If the addressing information indicates that the receiving node 610 is not the destination for the data unit, the node may look up the destination node 610 within receiving node's routing information and route the data unit to another node 610 connected to the receiving node 610 based on forwarding instructions associated with the destination node 610 (or an address group to which the destination node belongs). The forwarding instructions may indicate, for instance, an outgoing port over which to send the packet, a label to attach the packet, etc. In cases where multiple paths to the destination node 610 are possible, the forwarding instructions may include information indicating a suitable approach for selecting one of those paths, or a path deemed to be the best path may already be defined.

Addressing information, flags, labels, and other metadata used for determining how to handle a data unit is typically embedded within a portion of the data unit known as the header. The header is typically at the beginning of the data unit, and is followed by the payload of the data unit, which is the information actually being sent in the data unit. A header is typically comprised of fields of different types, such as a destination address field, source address field, destination port field, source port field, and so forth. In some protocols, the number and the arrangement of fields may be fixed. Other protocols allow for arbitrary numbers of fields, with some or all of the fields being preceded by type information that explains to a node the meaning of the field.

A traffic flow is a sequence of data units, such as packets, from a source computer to a destination. In an embodiment, the source of the traffic flow may mark each data unit in the sequence as a member of the flow using a label, tag, or other suitable identifier within the data unit. In another embodiment, the flow is identified by deriving an identifier from other fields in the data unit (e.g. a "five-tuple" combination of a source address, source port, destination address, destination port, and protocol). A flow is often intended to be sent in sequence, and network devices are therefore typically configured to send all data units within a given flow along a same path to ensure that the flow is received in sequence.

For convenience, many of the techniques described in this disclosure are described with respect to routing IP packets in an L3 (level 3) network, or routing cells and frames thereof in an L2 (level 2) network, in which contexts the described techniques have particular advantages. It will be recognized, however, that these techniques may also be applied to realize advantages in routing other types of data units conforming to other protocols and/or at other communication layers within a network. Thus, unless otherwise stated or apparent, the terms "data unit" and "packet" as used herein should be understood to refer to any type of data structure communicated across a network, including packets as well as segments, cells, data frames, datagrams, and so forth.

5.2. Network Paths

Any node in the depicted network 600 may communicate with any other node in the network 600 by sending packets through a series of nodes 610 and links, referred to as a path. For example, Node B (610*b*) may send packets to Node H (610*h*) via a path from Node B to Node D to Node E to Node H. There may be a large number of valid paths between two nodes. For example, another path from Node B to Node H is from Node B to Node D to Node G to Node H.

In an embodiment, a node 610 does not actually need to specify a full path for a packet that it sends. Rather, the node 610 may simply be configured to calculate the best path for the packet out of the device (e.g. which egress port it should send the packet out on). When a node 610 receives a packet that is not addressed directly to the node 610, based on header information associated with a packet, such as path and/or destination information, the node 610 relays the packet along to either the destination node 610, or a "next hop" node 610 that the node 610 calculates is in a better position to relay the packet to the destination node 610. In this manner, the actual path of a packet is product of each node 610 along the path making routing decisions about how best to move the packet along to the destination node 610 identified by the packet.

5.3. Network Device

Figure 7:
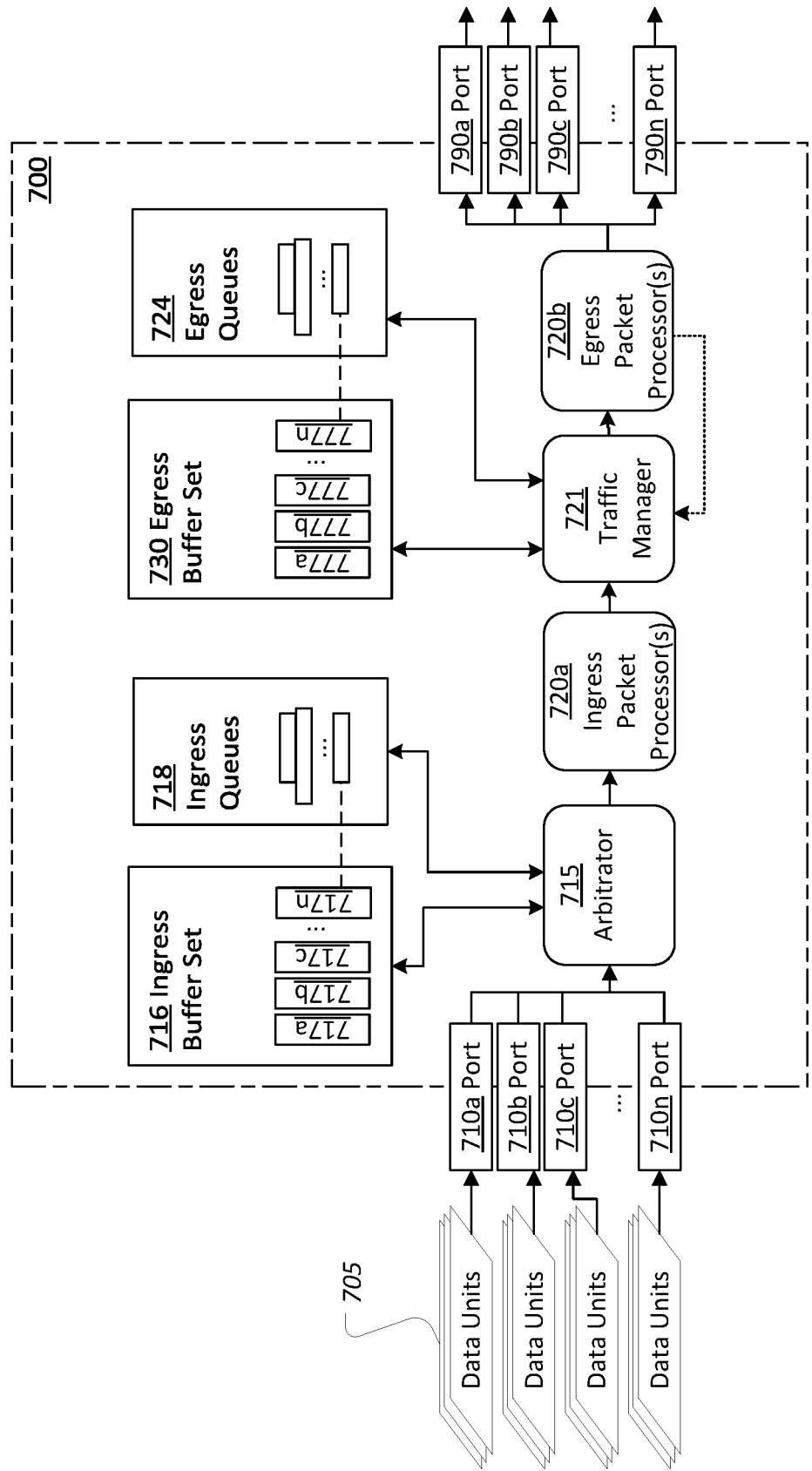
FIG. 7 is an illustrative view of various aspects of an example network device in which techniques described herein may be practiced.

FIG. 7 is an illustrative view of various aspects of an example network device 700 in which techniques described herein may be practiced, according to an embodiment. Network device 700 is a computing device comprising any combination of hardware and software configured to implement the various logical components described herein, including components 710-790. Note that, in an embodiment, some or all of the nodes 610 in system 600 may each be or include a separate network device 700.

In another embodiment, device 700 may be one of a number of components in a node 610. For instance, network device 700 may be an integrated circuit, or "chip," dedicated to performing switching and/or routing functions within a network switch or router. The network switch or router may further comprise one or more central processor units, storage units, memories, physical interfaces, LED displays, or other components external to the chip, some or all of which may communicate with the chip. The network switch or router may even include multiple devices 700.

5.4. Ports

Network device 700 includes ports 710/790. Ports 710, including ports 710*a-n*, are inbound ("ingress") ports by which data units 705 are received over a network, such as network 610. Ports 790, including ports 790*a-n*, are outbound ("egress") ports by which at least some of the packets 705 are sent out to other destinations within the network, after having been processed by the network device 700.

Data units 705 may be packets, cells, frames, or other suitable structures. In many embodiments, the individual atomic data units 705 upon which the depicted components typically operate are cells or frames. That is, data units are received, acted upon, and transmitted at the cell or frame level. These cells or frames are logically linked together as the packets to which they respectively belong for purposes of determining how to handle the cells or frames. However, the cells or frames may not actually be assembled into packets within device 700, particularly if the cells or frames are being forwarded to another destination through device 700.

Ports 710/790 are depicted as separate ports for illustrative purposes, but may actually correspond to the same physical hardware ports (e.g. network jacks or interfaces) on the network device 710. That is, a network device 700 may both receive data units 705 and send data units 705 over a single physical port, and the single physical port may thus function as both an ingress port 710 and egress port 790. Nonetheless, for various functional purposes, certain logic of the network device 700 may view a single physical port as a separate ingress port 710 and egress port 790. Moreover, for various functional purposes, certain logic of the network device 700 may subdivide a single physical ingress port or egress port into multiple ingress ports 710 or egress ports 790, or aggregate multiple physical ingress ports or multiple egress ports into a single ingress port 710 or egress port 790. Hence, in various embodiments, ports 710 and 790 should be understood as distinct logical constructs that are mapped to physical ports rather than simply as distinct physical constructs.

In some embodiments, the ports 710/790 of a device 700 may be coupled to one or more transceivers, such as Serializer/Deserializer ("SerDes") blocks. For instance, ports 710 may provide parallel inputs of received data units into a SerDes block, which then outputs the data units serially into an ingress packet processor 720*a*. On the other end, an egress packet processor 720*b* may input data units serially into another SerDes block, which outputs the data units in parallel to ports 790. There may be any number of input and output SerDes blocks, of any suitable size, depending on the specific implementation (e.g. four groups of 4×25 gigabit blocks, eight groups of 4×100 gigabit blocks, etc.).

5.5. Packet Processors

A device 700 comprises one or more packet processing components 720, such as the depicted ingress packet processor 720*a* and egress packet processor 720*b*, that collectively implement forwarding logic by which the device 700 is configured to determine how to handle each packet the device 700 receives. These packet processors 720 may be any suitable combination of fixed circuitry and/or software-based logic, such as specific logic components implemented by one or more Field Programmable Gate Arrays (FPGAs) or Application-Specific Integrated Circuits (ASICs), or a general-purpose processor executing software instructions.

Different packet processors 720 may be configured to perform different packet processing tasks. For instance, some packet processors may forward data units 705 out egress ports 790, other packet processors 720 may implement flow control mechanisms, other packet processors 720 may perform statistical collection or debugging tasks, and so forth. A device 700 may comprise any number of packet processors 720 configured to perform any number of processing tasks.

In an embodiment, the packet processors 720 of a device 700 are arranged such that the output of one packet processor 720 is, eventually, input into another processor 720, in such a manner as to pass data units 705 from certain packet processor(s) 720 to other packet processor(s) 720 in a sequence of stages, until finally disposing of the data units 705 (e.g. by sending the out an egress port 790, "dropping" packets, etc.). The exact set and/or sequence of packet processors 720 that process a given data unit 705 may vary, in some embodiments, depending on the attributes of the data unit 705 and/or the state of the device 700.

Ingress and Egress Processors

In an embodiment, a packet processor 720 may be generally classified as an ingress packet processor 720*a* or an egress packet processor 720*b*. Generally speaking, an ingress packet processor 720*a* performs certain intake tasks on data units 705 as they arrive. These intake tasks may include, for instance, and without limitation, parsing data units 705, performing routing related lookup operations, categorically blocking data units 705 with certain attributes and/or when the device 700 is in a certain state, duplicating certain types of packets, making initial categorizations of packets, and so forth. In an embodiment, there may be fewer ingress packet processors 720*a* relative to egress packet processor(s) 720*b*, or even just one ingress packet processor 720*a*.

The egress packet processor(s) 720*b* of a device 700, by contrast, are configured to perform all non-intake tasks necessary to implement the forwarding logic of the device 700. These tasks may include, for example, tasks such as identifying paths along which to forward packets, implementing flow control and/or other policies, manipulating packets, performing statistical or debugging operations, and so forth. In an embodiment, there may be different egress packet processors(s) 720*b* assigned to different flows or other categories of traffic, such that not all data units 705 will be processed by the same egress packet processor 720*b*.

In an embodiment, multiple egress packet processor(s) 720*b* may be chained together such that a data unit 705 processed by a first egress packet processor 720*b* is later processed by a second egress packet processor 720*b* configured to send the data unit 705 out a specific port 790. There is no limit to the number of packet processor(s) 720*b* within such a chain.

Forwarding Logic and Tables

As mentioned, the packet processors 720 collectively implement the forwarding logic of a device 700. The forwarding logic of a device 700, or portions thereof, may, in some instances, be hard-coded into the packet processors 720. For instance, the device 700 may be configured to always react to certain types of data units in certain circumstances in a certain way. The forwarding logic, or portions thereof, may also be configurable, in that the logic changes over time in response to data collected from or instructions received from other nodes in the network in which the device 700 is located.

For example, a device 700 will typically store in its memories one or more forwarding tables (or equivalent structures) that map certain data unit attributes or characteristics to actions to be taken with respect to data units having those attributes or characteristics, such as sending the data unit to a selected path, or processing the data unit using a specified internal component. For instance, such attributes or characteristics may include a Quality-of-Service level specified by the data unit or associated with another characteristic of the data unit, a flow control group, an ingress port 710 through which the data unit was received, a tag or label in a packet's header, a source address, a destination address, a packet type, or any other suitable distinguishing property.

In an embodiment, forwarding logic may read port state data. Port state data may include, for instance, flow control state information describing various traffic flows and associated traffic flow control rules or policies, link status information indicating links that are up or down, port utilization information indicating how ports are being utilized (e.g. utilization percentages, utilization states, etc.). Forwarding logic may be configured to implement the associated rules or policies associated with the flow(s) to which a given packet belongs.

As data units are routed through different nodes in a network, the nodes may, on occasion, discard, fail to send, or fail to receive data units, thus resulting in the data units failing to reach their intended destination. The act of discarding of a data unit, or failing to deliver a data unit, is typically referred to as "dropping" the data unit. Instances of dropping a data unit, referred to herein as "drops" or "packet loss," may occur for a variety of reasons, such as resource limitations, errors, or deliberate policies.

According to an embodiment, the forwarding logic reads certain instructions for handling network traffic from one or more tables. Generally, the tables describe groups of one or more addresses, such as subnets of IPv4 or IPv6 addresses. Each address is an address of a network device on a network, though a network device may have more than one address. Each group is associated with a potentially different set of one or more actions to execute with respect to data units that resolve to (e.g. are directed to) an address within the group. Any suitable set of one or more actions may be associated with a group of addresses, including without limitation, forwarding a message to a specified "next hop," duplicating the message, changing the destination of the message, dropping the message, performing debugging or statistical operations, applying a quality of service policy or flow control policy, and so forth.

For illustrative purposes, these tables are described as "forwarding tables," though it will be recognized that the extent of the action(s) described by the tables may be much greater than simply where to forward the message. For example, in an embodiment, a table may be a basic forwarding table that simply specifies a next hop for each group. In other embodiments, a table may describe one or more complex policies for each group. Moreover, there may be different types of tables for different purposes. For instance, one table may be a basic forwarding table that is compared to the destination address of each packet, while another table may specify policies to apply to packets upon ingress based on their destination (or source) group, and so forth.

In an embodiment, system 700 comprises path management control logic that is configured to adjust the forwarding instructions described by a forwarding table based on a variety of factors. For example, path management control logic may be configured to recognize administrative commands that explicitly instruct the path management control logic to add or remove address groups or adjust existing instructions for a group. Path management control logic may also adjust forwarding instructions in response to events that imply changes to the forwarding instructions, such as the receipt of data units that announce the availability of new paths in a network, the dropping of a certain number of packets to a destination, the application of certain flow control measures, or any other suitable event.

In an embodiment, groups of addresses are described using an address prefix. This prefix is, in essence, a beginning address portion that is common to each address in the group. The beginning address portion may be, for instance, a first number of bits, bytes, or other element. As used herein, a "prefix entry" generally refers to a data entry (i.e. in a forwarding table) which maps a particular prefix to one or more actions to be performed with respect to network packets or other data structures associated with an input key (e.g. address) that matches the particular prefix. Thus, when determining how to handle a certain packet, forwarding logic may determine a group of addresses that a data packet is associated with (e.g. a destination subnet, source subnet, etc.) using a prefix, and perform the one or more actions associated with that group.

5.6. Buffers

Since not all data units 705 received by the device 700 can be processed by the packet processor(s) 720 at the same time, various components of device 700 may temporarily store data units 705 in memory structures referred to as buffers while the data units 705 are waiting to be processed. For example, a certain packet processor 720 may only be capable of processing a certain number of data units 705, or portions of data units 705, in a given clock cycle, meaning that other data units 705, or portions of data units 705, must either be ignored (i.e. dropped) or stored. At any given time, a large number of data units 705 may be stored in the buffers of the device 700, depending on network traffic conditions.

Each buffer may be a portion of any type of memory, including volatile memory and/or non-volatile memory. In an embodiment, each buffer is a distinct single-ported memory, supporting only a single input/output (I/O) operation per clock cycle (i.e. either a single read operation or a single write operation). Single-ported memories may be utilized for higher operating frequency, though in other embodiments multi-ported memories may be used instead. In an embodiment, each of these buffers is capable of being accessed concurrently with each other buffer in a same clock cycle, though full realization of this capability is not necessary. In an embodiment, each buffer is a distinct memory bank, or set of memory banks. In yet other embodiments, a buffer may be a region within a memory bank. In an embodiment, each buffer comprises many addressable "slots" or "entries" (e.g. rows, columns, etc.) in which data units 705, or portions thereof, may be stored.

A device 700 may include a variety of buffers or sets of buffers, each utilized for varying purposes and/or components. Generally, a data unit awaiting processing by a component is held in a buffer associated with that component until it is "released" to the component for processing.

A component that utilizes one or more buffers may include a buffer manager configured to manage use of those buffer(s). Among other processing tasks, the buffer manager may, for example, allocate and deallocate specific segments of memory for buffers, create and delete buffers within that memory, identify available buffer entries in which to store a data unit 705, maintain a mapping of buffers entries to data units 705 stored in those buffers entries (e.g. by a packet sequence number assigned to each packet when the first data unit 705 in that packet was received), mark a buffer entry as available when a data unit 705 stored in that buffer is dropped, sent, or released from the buffer, determine when a data unit must be dropped because it cannot be stored in a buffer, perform garbage collection on buffer entries for data units 705 (or portions thereof) that are no longer needed, and so forth.

A buffer manager may include buffer assignment logic. The buffer assignment logic is configured to identify which buffer should be utilized to store a given data unit 705, or portion thereof. In some embodiments, each packet is stored in a single entry within its assigned buffer. In yet other embodiments, a packet is received as, or divided into, constituent data units such as fixed-size cells or frames. The buffers may store these constituent data units separately (e.g. not in the same location, or even the same buffer).

In some embodiments, the buffer assignment logic is relatively simple, in that data units are assigned to buffers randomly or using a round-robin approach. In some embodiments, data units 705 are assigned at least partially based on characteristics of those data units 705, such as corresponding traffic flows, destination addresses, source addresses, ingress ports, and/or other metadata. For example, different buffers or sets of buffers may be utilized to store data units received from different ports or sets of ports. In an embodiment, the buffer assignment logic also or instead utilizes buffer state information, such as utilization metrics, to determine which buffer to assign to a data unit. Other assignment considerations may include buffer assignment rules (e.g. no writing two consecutive cells from the same packet to the same buffer) and I/O scheduling conflicts (e.g. to avoid assigning a data unit to a buffer when there are no available write operations to that buffer on account of other components reading content already in the buffer).

5.7. Queues

In an embodiment, to manage the order in which data units 705 are processed from the buffers, various components of a device 700 may implement queueing logic. Each data unit 705, or the buffer locations(s) in which it is stored, is said to belong to one or more constructs referred to as queues. Typically, a queue is a set of memory locations (i.e. in the buffers) arranged in some order by metadata describing the queue. The memory locations may (and often are) non-contiguous relative to their addressing scheme and/or physical arrangement. For example, the metadata for one queue may indicate that the queue is comprised of, in order, entries 1, 50, 3, and 82 in a certain buffer.

The sequence in which the queue arranges its constituent data units 705 generally corresponds to the order in which the data units 705 in the queue will be released and processed. In some embodiments, the number of data units 705 assigned to a given queue at a given time may be limited, either globally or on a per-queue basis, and this limit may change over time.

5.8. Egress Traffic Management

According to an embodiment, a device 700 includes one or more traffic managers 721 configured to control the flow of data units from the ingress packet processor(s) 720*a* to the egress packet processor(s) 720*b*. Device 700 may include egress buffers 722, depicted in FIG. 7 as individual buffers 722*a-n*, which collectively form an egress buffer memory 730. A buffer manager within the traffic manager 721 may temporarily store data units 705 in buffers 722 as they await processing by egress processor(s) 720*b*. The number of egress buffers 722 may vary depending on the embodiment. In an embodiment, the traffic manager 721 is coupled to the ingress packet processor(s) 720*a*, such that data units 705 (or portions thereof) are assigned to buffers 722 only upon being initially processed by an ingress packet processor 720*a*. Once in an egress buffer 722, a data unit 705 (or portion thereof) may be "released" to one or more egress packet processor(s) 720*b* for processing, either by the traffic manager 721 sending a link or other suitable addressing information for the corresponding buffer 722 to the egress packet processor 720*b*, or by sending the data unit 705 directly.

Beyond managing the use of buffers 722 to store data units 705 (or copies thereof), the traffic manager 721 may include queueing logic configured to assign buffer entries to queues 724 and manage the flow of data units 705 through the queues 724. The traffic manager 721 may, for instance, identify a specific queue 724 to assign a data unit 705 to upon ingress of the data unit 705. The traffic manager 721 may further determine when to release—also referred to as "dequeuing"—data units 705 (or portions thereof) from queues 724 and provide that data to specific packet processor(s) 720. The traffic manager 721 may further "deallocate" entries in buffer 722 that are no longer being utilized when the data stored within those entries are dequeued from their respective queues. These entries are then reclaimed for use in storing new data through a garbage collection process.

In an embodiment, different queues 724 may exist for different destinations. For example, each port 710 and/or port 790 may have its own set of queues 724. The queue 724 to which a data unit 705 is assigned may, for instance, be selected based on forwarding information indicating which port 790 the packet should depart from. In an embodiment, a different packet processor 720*b* may be associated with each different set of one or more queues 724. In an embodiment, the current processing context of the data unit 705 may be used to select which queue 724 a data unit 705 should be assigned to.

In an embodiment, there may also or instead be different queues 724 for different flows or sets of flows. That is, each identifiable traffic flow or group of traffic flows is assigned its own set of queues 724 to which its data units 705 are respectively assigned. In an embodiment, different queues 724 may correspond to different classes of traffic or quality-of-service (QoS) levels. Different queues 724 may also or instead exist for any other suitable distinguishing property of the data units 705, such as source address, destination address, packet type, and so forth.

For instance, a data unit 705 may be forwarded to another queue 724 associated with another processing stage implemented by another set of processing components, sent out of the device 700 over an outbound port 790, discarded, delayed for flow control reasons, and so forth. The collective actions of these processing components over these multiple stages is said to implement the forwarding logic of the device 700.

Though only one packet processor 720*b* and a single traffic manager 721 are depicted, a device 700 may comprise any number of packet processors 720*b* and traffic managers 721. For instance, different sets of ports 710 and/or ports 790 may have their own traffic manager 721 and packet processors 720. As another example, in an embodiment, the traffic manager 721 may be duplicated for some or all of the stages of processing a data unit. For example, system 700 may include a traffic manager 721 and egress packet processor 720*b* for an egress stage performed upon the data unit 705 exiting the system 700, and/or a traffic manager 721 and packet processor 720 for any number of intermediate stages. The data unit 705 may thus pass through any number of traffic managers 721 and/or egress packet processors 720*b* prior to exiting the system 700. In other embodiments, only a single traffic manager 721 is needed. If intermediate processing is needed, flow of a data unit 705 may "loop back" to the traffic manager 721 for buffering and/or queuing after each stage of intermediate processing.

An example flow of a data unit 705 through device 700 is as follows. The data unit 705 may be received by a port 710. The data unit 705 is then processed by an ingress packet processor 720*a*, and then delivered to a traffic manager 721. Traffic manager 721 stores the data unit 705 in a buffer 722 and assigns the data unit 705 to a queue 724. Traffic manager 721 manages the flow of the data unit 705 through the queue 724 until the data unit 705 is released to an egress packet processor 720*b*. Depending on the processing, the traffic manager 721 may then assign the data unit 705 to another queue 724 so that it may be processed by yet another processor 720, or the packet processor 720b may send the data unit 705 out another port 790.

In the course of processing a data unit 705, a device 700 may replicate a data unit 705 one or more times. For example, a data unit 705 may be replicated for purposes such as multicasting, mirroring, debugging, and so forth. Thus, a single data unit 705 may be replicated to multiple queues 724. Hence, though certain techniques described herein may refer to the original data unit 705 that was received by the device 700, it will be understood that those techniques will equally apply to copies of the data unit 705 that have been generated for various purposes. A copy of a data unit 705 may be partial or complete. Moreover, there may be an actual physical copy of the data unit 705 in buffers 722, or a single copy of the data unit 705 may be linked from a single buffer location 722 to multiple queues 724 at the same time.

5.9. Arbiter

According to embodiments, system 700 further includes one or more arbitration components, or arbiters, 715, deployed in front of ingress processor(s) 720a. Arbiter 715 is coupled to an ingress buffer memory 716 comprising ingress buffers 717a-n (collectively ingress buffers 717). Arbiter 715 may utilize buffers 717 to temporarily store incoming data units 705 before sending them to an ingress packet processor 720a. Arbiter 715 may be configured to always store incoming data units 705 in buffers 717, or only when needed to avoid potential drops at oversaturated downstream components.

Each data unit 705 is stored in one or more entries within one or more buffers 717, which entries are marked as utilized to prevent newly received data units 705 from overwriting data units 705 that are already buffered. After a data unit 705 is released to an ingress processor 720a, the one or more entries in which a data unit 705 is buffered may then marked as available for storing new data units 705.

Buffer memory 716 may be a same or different memory than buffer memory 730. In embodiments where buffer memory 716 and 730 are the same, ingress buffers 717 and egress buffers 722 may be different portions of that same memory, allocated to ingress and egress operations, respectively.

In an embodiment, buffers 717 and 722 may in fact include at least some of the same physical buffers, and be separated only from a logical perspective. In such an embodiment, metadata or internal markings may indicate whether a given individual buffer entry belongs to an ingress buffer 717 or egress buffer 722. To avoid contention when distinguished only in the logical sense, ingress buffers 717 and egress buffers 722 may be allotted a certain number of entries in each of the physical buffers that they share, and the number of entries allotted to a given logical buffer is said to be the size of that logical buffer. In some such embodiments, instead of copying the data unit from an ingress buffer entry to an egress buffer entry as it transitions through system 700, the data unit may remain in the same buffer entry, and the designation of the buffer entry (e.g. as belonging to an ingress queue versus an egress queue) changes with the stage of processing.

Arbiter 715 may release a center number of data units from buffers 717 to ingress packet processor(s) 720a each clock cycle or other defined period of time. The next entry to release may be identified using one or more ingress queues 718. For instance, each ingress port 710 or group of ports 710 may be assigned an ingress queue 718. Ingress queues 718 may be, for example, first-in-first-out queues. That is, when deciding which data unit 705 in a queue 718 to release next, the data unit that has been in the queue 718/buffers 717 the longest is selected.

In embodiments with multiple queues 718, a variety of mechanisms may be utilized to identify the next queue 718 from which to release a data unit 705. For example, each queue 718 may be assigned one or more slots each clock cycle (or other defined time period), and the next queue 718 may be selected using a round-robin approach that rotates through these slots. As another example, the next queue 718 may be selected using a random, or probabilistic approach. In an embodiment, each queue 718 may be weighted by an advertised transmission rate. For instance, for every one packet released from a queue 718 for a 100 Mbps port, ten might be released from a queue for a 1 Gbps port. The length and/or average age of a queue 718 might also or instead be utilized to prioritize queue selection. In an embodiment, a downstream component may instruct the arbiter 715 to release data units from certain ports. Hybrid approaches may be used. For example, one of the longest queues 718 may be selected each odd clock cycle, and a random queue 718 may be selected every even clock cycle. In an embodiment, a token-based mechanism is utilized, as described in other sections.

Yet other queue selection mechanisms are also possible. The techniques described herein are not specific to any one of these mechanisms, unless otherwise stated.

In an embodiment, queues 718 may also or instead exist for specific groups of related traffic, also referred to as priority sets or classes of service. For instance, all data units carrying VoIP traffic might be assigned to a first queue 718, while all data units carrying Storage Area Network ("SAN") traffic might be assigned to a different queue 718. Each of these queues 718 might be weighted differently, so as to prioritize certain types of traffic over other traffic. Moreover, there may be different queues 718 for specific combinations of ports and priority sets.

5.10. Miscellaneous

System 700 illustrates only one of many possible arrangements of components configured to provide the functionality described herein. Other arrangements may include fewer, additional, or different components, and the division of work between the components may vary depending on the arrangement. For instance, in an embodiment, an ingress processor 720a is omitted and data units 705 are released directly to a traffic manager 721. As another example, there may be any number of traffic managers 721, each with its own set of queues 724 and coupled to its own set of one or more egress processors 720b. In an embodiment, a device may be composed of multiple elements 715, 720, and 721. For instance, multiple ingress processors 720a may connect to multiple traffic managers 721, with each traffic manager 721 connected to one or more egress packet processors 720b.

In an embodiment, a group of ingress arbiters 715 sharing an ingress packet processor 720a, along with the circuitry coupled thereto, form a data handling system, such as data handling system 300, for an ingress processing stage of system 700. In an embodiment, a group of traffic managers 721 sharing an egress packet processor 720b, along with the circuitry coupled thereto, form a data handling system, such as data handling system 300, for an egress processing stage. There may be multiple data handling systems for both stages. Moreover, traffic managers 721 may serve as destinations for an ingress data handling system.

6.0. IMPLEMENTATION MECHANISM—HARDWARE OVERVIEW

According to one embodiment, the techniques described herein are implemented by one or more special-purpose computing devices. The special-purpose computing devices may be desktop computer systems, portable computer systems, handheld devices, networking devices, or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques. Such special-purpose computing devices may also combine custom hard-wired logic, ASICs, FPGAs, or other circuitry with custom programming to accomplish the techniques.

Though certain foregoing techniques are described with respect to a hardware implementation, which provides a number of advantages in certain embodiments, it will also be recognized that, in other embodiments, the foregoing techniques may still provide certain advantages when performed partially or wholly in software. Accordingly, in such an embodiment, a suitable implementing apparatus comprises a general-purpose hardware processor and is configured to perform any of the foregoing methods by executing program instructions in firmware, memory, other storage, or a combination thereof.

Figure 8:
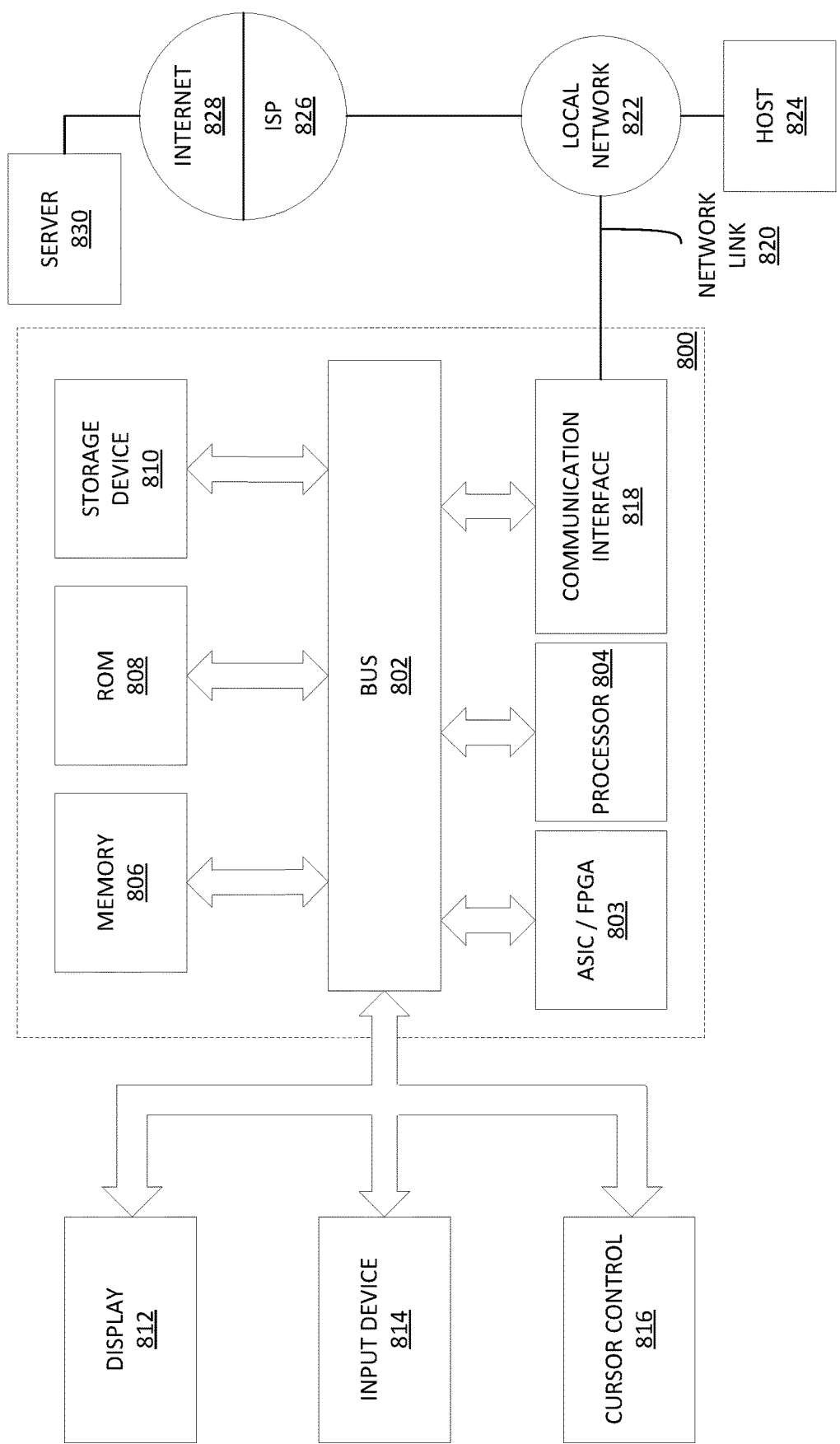
FIG. 8 is block diagram of a computer system upon which embodiments of the inventive subject matter may be implemented.

FIG. 8 is a block diagram that illustrates a computer system 800 that may be utilized in implementing the above-described techniques, according to an embodiment. Computer system 800 may be, for example, a desktop computing device, laptop computing device, tablet, smartphone, server appliance, computing mainframe, multimedia device, handheld device, networking apparatus, or any other suitable device. In an embodiment, FIG. 8 and FIG. 3 are both different views of a same networking device.

Computer system 800 may include one or more ASICs, FPGAs, or other specialized circuitry 803 for implementing program logic as described herein. For example, circuitry 803 may include fixed and/or configurable hardware logic blocks for implementing some or all of the described techniques, input/output (I/O) blocks, hardware registers or other embedded memory resources such as random access memory (RAM) for storing various data, and so forth. The logic blocks may include, for example, arrangements of logic gates, flip-flops, multiplexers, and so forth, configured to generate an output signals based on logic operations performed on input signals.

Additionally, and/or instead, computer system 800 may include one or more hardware processors 804 configured to execute software-based instructions. Computer system 800 may also include one or more busses 802 or other communication mechanism for communicating information. Busses 802 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 800 also includes one or more memories 806, such as a RAM, hardware registers, or other dynamic or volatile storage device for storing data units to be processed by the one or more ASICs, FPGAs, or other specialized circuitry 803. Memory 806 may also or instead be used for storing information and instructions to be executed by processor 804. Memory 806 may be directly connected or embedded within circuitry 803 or a processor 804. Or, memory 806 may be coupled to and accessed via bus 802. Memory 806 also may be used for storing temporary variables, data units describing rules or policies, or other intermediate information during execution of program logic or instructions.

Computer system 800 further includes one or more read only memories (ROM) 808 or other static storage devices coupled to bus 802 for storing static information and instructions for processor 804. One or more storage devices 810, such as a solid-state drive (SSD), magnetic disk, optical disk, or other suitable non-volatile storage device, may optionally be provided and coupled to bus 802 for storing information and instructions.

A computer system 800 may also include, in an embodiment, one or more communication interfaces 818 coupled to bus 802. A communication interface 818 provides a data communication coupling, typically two-way, to a network link 820 that is connected to a local network 822. For example, a communication interface 818 may be an integrated services digital network (ISDN) card, cable modem, satellite modem, or a modem to provide a data communication connection to a corresponding type of telephone line. As another example, the one or more communication interfaces 818 may include a local area network (LAN) card to provide a data communication connection to a compatible LAN. As yet another example, the one or more communication interfaces 818 may include a wireless network interface controller, such as a 802.11-based controller, Bluetooth controller, Long Term Evolution (LTE) modem, and/or other types of wireless interfaces. In any such implementation, communication interface 818 sends and receives electrical, electromagnetic, or optical signals that carry digital data streams representing various types of information.

Network link 820 typically provides data communication through one or more networks to other data devices. For example, network link 820 may provide a connection through local network 822 to a host computer 824 or to data equipment operated by a Service Provider 826. Service Provider 826, which may for example be an Internet Service Provider (ISP), in turn provides data communication services through a wide area network, such as the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

In an embodiment, computer system 800 can send packets and receive data through the network(s), network link 820, and communication interface 818. In some embodiments, this data may be data units that the computer system 800 has been asked to process and, if necessary, redirect to other computer systems via a suitable network link 820. In other embodiments, this data may be instructions for implementing various processes related to the described techniques. For instance, in the Internet example, a server 830 might transmit a requested code for an application program through Internet 828, ISP 826, local network 822 and communication interface 818. The received code may be executed by processor 804 as it is received, and/or stored in storage device 810, or other non-volatile storage for later execution. As another example, information received via a network link 820 may be interpreted and/or processed by a software component of the computer system 800, such as a web browser, application, or server, which in turn issues instructions based thereon to a processor 804, possibly via an operating system and/or other intermediate layers of software components.

Computer system 800 may optionally be coupled via bus 802 to one or more displays 812 for presenting information to a computer user. For instance, computer system 800 may be connected via an High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 812 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 812.

One or more input devices 814 are optionally coupled to bus 802 for communicating information and command selections to processor 804. One example of an input device 814 is a keyboard, including alphanumeric and other keys. Another type of user input device 814 is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane. Yet other examples of suitable input devices 814 include a touch-screen panel affixed to a display 812, cameras, microphones, accelerometers, motion detectors, and/or other sensors. In an embodiment, a network-based input device 814 may be utilized. In such an embodiment, user input and/or other information or commands may be relayed via routers and/or switches on a Local Area Network (LAN) or other suitable shared network, or via a peer-to-peer network, from the input device 814 to a network link 820 on the computer system 800.

As discussed, computer system 800 may implement techniques described herein using customized hard-wired logic, one or more ASICs or FPGAs 803, firmware and/or program logic, which in combination with the computer system causes or programs computer system 800 to be a special-purpose machine. According to one embodiment, however, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and use a modem to send the instructions over a network, such as a cable network or cellular network, as modulated signals. A modem local to computer system 800 can receive the data on the network and demodulate the signal to decode the transmitted instructions. Appropriate circuitry can then place the data on bus 802. Bus 802 carries the data to main memory 806, from which processor 804 retrieves and executes the instructions. The instructions received by main memory 806 may optionally be stored on storage device 810 either before or after execution by processor 804.

7.0. EXTENSIONS AND ALTERNATIVES

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the inventive subject matter have been described with reference to numerous specific details that may vary from implementation to implementation. Thus, the sole and exclusive indicator of what is the inventive subject matter, and is intended by the applicants to be the inventive subject matter, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A network switching apparatus comprising:
   multiple data unit sources configured to receive data units, each of the data units having a control portion and a payload portion;
   multiple control paths, each control path coupled to a different data unit source, the data unit sources configured to send first portions of the data units along the control paths, the first portions including control portions;
   multiple data paths, separate from the control paths, each data path coupled to a different data unit source, the data unit sources configured to send payload portions of the data units along the data paths;
   an adaptive distributor configured to receive the first portions via the multiple control paths, the adaptive distributor comprising a buffer memory in which the adaptive distributor is configured to temporarily buffer the first portions until the first portions are ready for processing by a shared packet processor;
   the shared packet processor, configured to receive the first portions from the adaptive distributor, and to generate control information based on the control portions found in the first portions;
   a demuxer configured to receive the control information from the shared packet processor;
   merger subsystems, each merger subsystem configured to receive payload portions via a different data path of the multiple data paths, and to receive control information from the demuxer for the data units whose payload portions they receive, the merger subsystems further configured to output the data units with the control information generated for the data units.

2. The network switching apparatus of claim 1, wherein the adaptive distributor is configured to schedule the first portions for release from the buffer memory to the shared packet processor based on demand measures associated with the data unit sources.

3. The network switching apparatus of claim 2, wherein the demand measures reflect one or more of: lengths of data unit queues in the adaptive distributor, the data units queues corresponding to the data unit sources; lengths of queues within the data unit sources; arrival rates of the data units at the data unit sources; or buffer space utilization at the data unit sources.

4. The network switching apparatus of claim 1, wherein the adaptive distributor is configured to send instructions to the data unit sources to lower or increase rates at which the data unit sources output the control portions, based on demand measures associated with the data unit sources.

5. A system comprising:
   data unit sources configured to output portions of data units to control paths and data paths, each data unit source coupled to a unique data path and to a unique control path, with each data unit sent by the data unit source having a first portion that is outputted to the unique control path of the data unit source and a payload portion that is outputted to the unique data path of the data unit source;
   a shared packet processor configured to input first portions of the data units carried by the control paths, generate control information based on the first portions, and output the control information, the shared packet processor shared by all of the control paths;
   merger subsystems configured to receive payload portions of the data units via the data paths, receive the control information generated by the shared packet processor, correlate the control information with the payload portions, and output the data units with the correlated control information, each of the merger subsystems configured to receive corresponding payload portions via a different unique data path.

6. The system of claim 5, further comprising:
   an adaptive distributor coupled to the packet processor and to each of the control paths, the adaptive distributor configured to receive the first portions of the data units via the control paths and determine when to forward the first portions to the packet processor.

7. The system of claim 5, further comprising:
   an adaptive distributor configured to:
      receive the first portions of the data units via the control paths;
      buffer the first portions of the data units in a buffer memory;
      arrange the buffered first portions into queues, each of the queues corresponding to a different data unit source of the data unit sources;
      when the packet processor is ready to generate control information for a new data unit, select one of the queues from which to release a next first portion of a data unit to the packet processor.

8. The system of claim 5, further comprising:
   an adaptive distributor configured to receive the first portions of the data units via the control paths and determine when to forward the first portions to the packet processor, the determining comprising utilizing a policy to select, in a particular time slot, a particular data unit whose first portion is to be released to the packet processor, the policy configured based on demand measures associated with the data unit sources from which the first portions are sent.

9. The system of claim 8, wherein the adaptive distributor is further configured to adjust the policy over time based on the demand measures.

10. The system of claim 8, wherein the demand measures reflect one or more of: lengths of data unit queues in the adaptive distributor, the data units queues corresponding to the data unit sources; lengths of queues within the data unit sources; arrival rates of data units at the data unit sources; or buffer space utilization at the data unit sources.

11. The system of claim 5, further comprising:
   an adaptive distributor configured to receive the first portions of the data units via the control paths and determine when to forward the first portions to the packet processor;
   wherein, based on amounts of data unit portions buffered at the adaptive distributor for specific data unit sources, the adaptive distributor is further configured to send instructions to specific data unit sources to decrease or increase rates at which the specific data unit sources send the first portions to the adaptive distributor.

12. The system of claim 5, further comprising a demuxer to which the packet processor outputs the control information, the demuxer coupled to each of the merger subsystems and configured to forward particular control information for a particular data unit to a particular merger subsystem based on metadata associated with the particular control information that indicates a particular control path via which a first portion of the particular data unit was sent.

13. The system of claim 5, wherein each merger subsystem of the merger subsystems is configured to receive at least particular control information outputted by the packet processor, correlate that particular control information to particular payload portions of particular data units received via a particular data path of the plurality of data paths, and send the particular data units with their corresponding particular control information to an interconnect coupled to the merger subsystem.

14. A method comprising:
from each data unit source of a plurality of data unit sources, sending control portions of data units down a control path and payload portions of the data units down a data path, each data unit source having a unique control path and a unique data path, each of the data units having a control portion and a payload portion;
at a shared packet processor, receiving the control portions from each data unit source via the unique control path of the data unit source, the shared packet processor shared by all of the control paths;
generating control information for each data unit, of the data units, whose control portion is received at the shared packet processor, based on the control portion of that data unit;
sending the control information generated for each data unit, of the data units, whose control portion is received at the shared packet processor, to a particular merger subsystem that is coupled to a particular unique data path down which a corresponding payload portion of the data unit was sent, each unique data path coupled to a different merger subsystem;
for each data unit, of the data units, whose control portion is received at the shared packet processor, at the particular merger subsystem that receives the control information for the data unit, locating at least a particular payload portion that corresponds to the control information, and sending the control information and the located particular payload portion to an interconnect.

15. The method of claim 14, further comprising:
receiving the control portions from each data unit source at an adaptive distributor deployed between the data unit sources and the shared packet processor;
determining when to forward the control portions from the adaptive distributor to the shared packet processor, the determining including forwarding a first control portion of a first data unit before forwarding a second control portion of a second data unit that was received at the adaptive distributor before the first control portion.

16. The method of claim 14, further comprising:
receiving the control portions from each data unit source at an adaptive distributor deployed between the data unit sources and the shared packet processor;
buffering the control portions from each data unit source in a buffer memory of the adaptive distributor;
arranging the buffered control portions into queues, each of the queues corresponding to a different data unit source of the data unit sources;
when the shared packet processor is ready to generate control information for a new data unit, selecting one of the queues from which to release a next control portion to the packet processor.

17. The method of claim 14, further comprising:
receiving the control portions from each data unit source at an adaptive distributor deployed between the data unit sources and the shared packet processor;
determining when to forward the control portions from the adaptive distributor to the shared packet processor;
wherein the determining comprises utilizing a policy to select, in a particular time slot, a particular data unit whose control portion is to be released to the shared packet processor;
configuring the policy based on demand measures associated with the data unit sources from which the control portions are sent.

18. The method of claim 17, further comprising adjusting the policy over time based on the demand measures.

19. The method of claim 17, wherein the demand measures reflect one or more of: lengths of data unit queues in the adaptive distributor, the data units queues corresponding to the data unit sources; lengths of queues within the data unit sources; arrival rates of data units at the data unit sources; or buffer space utilization at the data unit sources.

20. The method of claim 14, further comprising:
receiving the control portions from each data unit source at an adaptive distributor deployed between the data unit sources and the shared packet processor;
determining when to forward the control portions from the adaptive distributor to the shared packet processor;
based on amounts of data unit portions buffered at the adaptive distributor for specific data unit sources, the adaptive distributor sending instructions to the specific data unit sources to decrease or increase rates at which the specific data unit sources send the control portions to the adaptive distributor.

* * * * *